United States Patent
Wang et al.

(10) Patent No.: US 7,741,992 B2
(45) Date of Patent: Jun. 22, 2010

(54) MOVING TARGET DETECTOR FOR RADAR SYSTEMS

(75) Inventors: Jian Wang, Waterloo (CA); Eli Brookner, Lexington, MA (US)

(73) Assignee: Raytheon Canada Limited, Ottawa, Ontario, CA (US)

( * ) Notice: Subject to any disclaimer, the term of this patent is extended or adjusted under 35 U.S.C. 154(b) by 106 days.

(21) Appl. No.: 12/298,059

(22) PCT Filed: Nov. 1, 2007

(86) PCT No.: PCT/US2007/023104

§ 371 (c)(1),
(2), (4) Date: Oct. 22, 2008

(87) PCT Pub. No.: WO2008/085223

PCT Pub. Date: Jul. 17, 2008

(65) Prior Publication Data

US 2009/0096662 A1    Apr. 16, 2009

Related U.S. Application Data

(60) Provisional application No. 60/864,019, filed on Nov. 2, 2006.

(51) Int. Cl.
*G01S 13/00* (2006.01)
(52) U.S. Cl. .................... 342/93; 342/101; 342/162
(58) Field of Classification Search .............. 342/93, 342/101, 162
See application file for complete search history.

(56) References Cited

U.S. PATENT DOCUMENTS 4,318,101 A    3/1982    Musha et al.

(Continued)

FOREIGN PATENT DOCUMENTS

EP    0 132 232 A2    1/1985

(Continued)

OTHER PUBLICATIONS

PCT International Preliminary Report on Patentability dated May 14, 2009 for PCT/US2007/023104 filed on Nov. 1, 2007, 9 pgs.

(Continued)

*Primary Examiner*—Thomas H Tarcza
*Assistant Examiner*—Timothy A Brainard
(74) *Attorney, Agent, or Firm*—Daly, Crowley, Mofford & Durkee, LLP

(57) ABSTRACT

Various embodiments are described herein for a moving target detector that processes input data to perform detection for a current range cell. The moving target detector includes a Doppler filter bank module for processing the input data to provide several Doppler outputs for the current range cell, a no-land-clutter path for processing several input data sets related to the several Doppler outputs to provide detection data by performing peak selection on each of the several input data sets and performing detection on the results of the peak selection, a land-clutter path for processing the several input data sets to provide detection data by performing Constant False Alarm Rate (CFAR) detection on each of the several input data sets and merging the detection results; and a switching logic module for selecting one of the land-clutter path and the no-land-clutter path based on clutter information.

45 Claims, 11 Drawing Sheets

U.S. PATENT DOCUMENTS

| | | | |
|---|---|---|---|
| 4,339,754 A | | 7/1982 | Hammers et al. |
| 4,636,793 A | * | 1/1987 | D'Addio et al. ............. 342/162 |
| 4,709,236 A | | 11/1987 | Taylor, Jr. |
| 5,457,462 A | | 10/1995 | Mitsumoto et al. |
| 5,594,451 A | | 1/1997 | Krikorian et al. |
| 5,644,315 A | | 7/1997 | Long |
| 5,798,728 A | * | 8/1998 | Tomishima et al. ........... 342/93 |

FOREIGN PATENT DOCUMENTS

| | | |
|---|---|---|
| EP | 0 227 457 A2 | 7/1987 |

OTHER PUBLICATIONS

PCT Search Report of the ISA for PCT/US2007/023104 dated Jul. 28, 2008.

PCT Written Opinion of the ISA for PCT/US2007/023104 dated Jul. 28, 2008.

\* cited by examiner

MOVING TARGET DETECTOR FOR RADAR SYSTEMS

This application claims the benefit of International Patent Application PCT/US 2007/023104 filed Nov. 1, 2007 and published in the English language on Jul. 17, 2008, which application claims priority from U.S. Provisional Application No. 60/864,019, filed Nov. 2, 2006.

FIELD

Various embodiments are disclosed herein that relate to a Moving Target Detector (MTD) for use in a radar system for detecting targets in the presence of clutter and noise.

BACKGROUND

Radar systems used for air traffic control, as well as other purposes, need to deal with more than receiver noise in that they also receive echoes (i.e. clutter) from natural environmental conditions such as land, sea and weather. When appearing at the same radar cell as targets, clutter returns can block target detection since the clutter return may be several orders of magnitude larger than targets. One option for detecting moving targets in the midst of large clutter is to take advantage of the different Doppler shifts between the targets and clutter. A Moving Target Indicator (MTI) is an example of a technique that takes advantage of this property, and has been operated in the field for decades. A Moving Target Detector (MTD) is a more advanced successor of the MTI, and represents a significant advance in target detection in clutter. The MTD also has the ability to detect large tangential targets with the help of clutter maps. Since it was originally developed by MIT Lincoln Laboratory in the 1970s, the MTD has evolved through several generations.

In a conventional current generation MTD, a burst of pulses is transmitted at a constant pulse repetition frequency (PRF), returns from which are called a coherent processing interval (CPI) on reception. In general, the PRF is staggered from CPI to CPI in order to eliminate blind speed. A bank of Doppler filters is applied across pulses received in each CPI to separate moving targets from clutter. The output of each Doppler filter is processed by a Constant False Alarm Rate (CFAR) detector that uses a dynamic clutter map. The dynamic clutter map enables the detection of large tangential targets that would otherwise be canceled by an ordinary MTI, and also helps to control the false alarm breakthrough of the nonzero Doppler filters. Other maps such as a digital Sensitivity Time Control (STC) map and a geo-censor map can also be employed during either the detection stage or the post plot editing stage in order to control angel clutter and/or other geographic interference, as is commonly known by those skilled in the art. The detections from the CFAR detectors are merged, and the final detections are further integrated in a binary integrator before being sent to a plot extractor for azimuth and range centroiding. The binary integrator correlates the detections from several consecutive CPIs to control false alarms due to clutter or second time around targets. However, there is information loss in the binary integrator in that its inputs are detection results (0 or 1), which results in processing gain loss.

SUMMARY

In one aspect, at least one embodiment described herein provides a moving target detector for processing input data to provide detection data. The moving target detector comprises a Doppler filter bank module for processing the input data to provide several Doppler outputs for a current range cell, a land-clutter path for providing first detection results based on the several Doppler outputs, a no-land-clutter path for providing second detection results based on the several Doppler outputs, a switching logic module for selecting one of the land-clutter path and the no-land-clutter path based on clutter information, and a range line multiplexer for providing the detection data by combining the first and second detection results across a plurality of range cells.

The no-land-clutter path comprises a peak selector for receiving several input data sets related to the several Doppler outputs and providing a peak output data set by selecting the input data set having the largest power, a video integrator for video integrating the peak output data to provide video integrated data, and a detector for processing the video integrated data to generate the second detection results.

The no-land-clutter path may further comprise a second time around target suppression module for reducing erroneous detection results in the second detection results.

The no-land-clutter path may further comprise a weather clutter canceller for reducing weather clutter in the several input data sets prior to processing by the peak selector.

The no-land-clutter path may further comprise a weather clutter canceller activate logic module for checking a dynamic weather map for weather clutter and activating the weather clutter canceller when the weather clutter is found, and a weather map module coupled to the weather clutter canceller activate logic module for generating and updating the dynamic weather map.

The detector can be a cell averaging Constant False Alarm Rate (CFAR) detector configured to employ an early range and late range average with peaks edited threshold, a scaled no-land-clutter dynamic clutter map value for pixel threshold, a digital sensitivity time control map based on minimum cross section threshold, and a geo-censor map threshold.

The clutter information may comprise a transition range value table including at least one transition range value for each azimuth segment of the radar data.

The switching logic module may be configured to select the no-land-clutter path when the current range cell is at a range greater than a maximum transition range value at a corresponding azimuth segment in the transition range value table.

Alternatively, the switching logic module may be configured to select the no-land-clutter path when the current range cell is at a range greater than an odd number of transition range values at a corresponding azimuth segment in the transition range value table.

At least one transition range value for one of the azimuth segments may be obtained from range values for cells at a corresponding azimuth segment in a clutter map having a clutter level less than a clutter threshold.

The clutter map can be a dynamic clutter map when anomalous propagation is detected, and a clear day clutter map otherwise.

Alternatively, at least one transition value for one of the azimuth segments may be obtained from a maximum of: a first maximum range value for a clear day clutter map cell at a corresponding azimuth segment having a first clutter level larger than a first threshold, a second maximum range value for a dynamic clutter map cell at the corresponding azimuth segment having a clutter level larger than a second threshold plus the first clutter level, and a third maximum range value for a dynamic weather map cell at the corresponding azimuth segment having a clutter level larger than a third threshold.

The clutter information may comprise a clutter map and the switching logic module may be configured to select the land-clutter path when clutter level in a cell of the clutter map that corresponds to the current range cell is larger than a clutter threshold and to otherwise select the no-land-clutter path.

The clutter map can be a dynamic clutter map when anomalous propagation is detected, and a clear day clutter map otherwise.

Alternatively, the clutter information may comprise a clear day clutter map, a dynamic clutter map and a dynamic weather map, and the switching logic module may be configured to perform thresholding on each of the maps, combine the thresholding results and select one of the no-land-clutter path and the land-clutter path based on the combined thresholding result.

In this case, the switching logic module can be configured to select the no-land clutter path when a first clutter level in a clear day clutter map cell corresponding to the current range cell is less than a first threshold, a second clutter level in a dynamic day clutter map cell corresponding to the current range cell is less than a second threshold plus the first clutter level, and a third clutter level in a dynamic weather map cell corresponding to the current range cell is less than a third threshold.

Alternatively, the switching logic module can be configured to select the no-land clutter path when a first clutter level in a clear day clutter map cell corresponding to the current range cell is less than a first threshold, a second clutter level in a dynamic day clutter map cell corresponding to the current range cell is greater than a second threshold plus the first clutter level, and a third clutter level in a dynamic weather map cell corresponding to the current range cell is greater than a third threshold and less than a fourth threshold.

The land-clutter path can comprise a CFAR detection module for processing the several input data sets to provide several CFAR outputs, a Doppler merge module for processing the several CFAR outputs to select the largest CFAR output, and a binary integrator for providing the first detection results by processing several selected largest CFAR outputs to indicate a detection when a minimum proportion of the several selected largest CFAR outputs indicate a detected target.

The CFAR detection module can be configured to employ the greatest of CFAR technique based on an early range with peak edited threshold, a late range average with peak edited threshold, a scaled dynamic clutter map value for pixel threshold, a digital sensitivity time control map based on minimum cross section threshold, and a geo-censor map threshold.

The moving target detector can further comprise one of a magnitude converter and a power converter for generating the several input data sets based on the several Doppler filter outputs.

The Doppler filter bank module can comprise a clear Doppler filter bank, and a clutter Doppler filter bank, wherein the clear Doppler filter bank is operational when the current range cell is at a range greater than a maximum transition range value at a corresponding azimuth segment in a transition range value table, otherwise the clutter Doppler filter bank is operational.

The no-land-clutter path is configured to process data based on the strongest of the several Doppler outputs prior to performing detection.

In another aspect, at least one embodiment described herein provides a method of processing input radar data to provide detection data. The method comprises:

processing the input radar data to provide several Doppler outputs for a current range cell;

determining whether there is land clutter for the current range cell based on clutter information;

providing first detection results based on the several Doppler outputs using a land-clutter path when land clutter is detected for the current range cell;

providing second detection results based on the several Doppler outputs using a no-land-clutter path when land clutter is not detected for the current range cell; and combining the first and second detection results across a plurality of range cells.

The step of providing the second detection results can comprise:

processing several input data sets related to the several Doppler outputs to provide peak output data by selecting the input data set having the largest power;

video integrating the peak output data to provide video integrated data; and performing detection on the video integrated data for generating the second detection results.

The may further comprise performing second time around target suppression for reducing erroneous detection results in the second detection results.

The method may further comprises reducing weather clutter in the several input data sets prior to processing to provide the peak output data when weather clutter is detected.

The detection step may comprise performing cell averaging Constant False Alarm Rate (CFAR) detection based on an early range and late range average with peaks edited threshold, a scaled no-land-clutter dynamic clutter map value for pixel threshold, a digital sensitivity time control map based on minimum cross section threshold, and a geo-censor map threshold.

The clutter information may comprise a transition range value table including at least one transition range value for each azimuth segment of the radar data.

The method may comprise using the no-land-clutter path when the current range cell is at a range greater than a maximum transition range value at a corresponding azimuth segment in the transition range value table.

Alternatively, the method may further comprise using the no-land-clutter path when the current range cell is at a range greater than an odd number of transition range values at a corresponding azimuth segment in the transition range value table.

The method may further comprise obtaining the at least one transition range value for one of the azimuth segments from range values for cells at a corresponding azimuth segment in a clutter map having a clutter level less than a clutter threshold.

The method may further comprises using a dynamic clutter map for the clutter map when anomalous propagation is detected, and using a clear day clutter map for the clutter map otherwise.

Alternatively, the at least one transition value for one of the azimuth segments may be obtained by selecting a maximum of: a first maximum range value for a clear day clutter map cell at a corresponding azimuth segment having a first clutter level larger than a first threshold, a second maximum range value for a dynamic clutter map cell at the corresponding azimuth segment having a clutter level larger than a second threshold plus the first clutter level, and a third maximum range value for a dynamic weather map cell at the corresponding azimuth segment having a clutter level larger than a third threshold.

The clutter information may comprise a clutter map and the method may comprise using the land-clutter path when clutter level in a cell of the clutter map that corresponds to the current range cell is larger than a clutter threshold and otherwise selecting the no-land-clutter path.

The method may further comprise using a dynamic clutter map for the clutter map when anomalous propagation is detected, and using a clear day clutter map for the clutter map otherwise.

Alternatively, the clutter information may comprise a clear day clutter map, a dynamic clutter map and a dynamic weather map, and the method may comprise performing thresholding on each of the maps, combining the thresholding results and using one of the no-land-clutter path and the land-clutter path based on the combined thresholding result.

In this case, the method may comprise using the no-land clutter path when a first clutter level in a clear day clutter map cell corresponding to the current range cell is less than a first threshold, a second clutter level in a dynamic day clutter map cell corresponding to the current range cell is less than a second threshold plus the first clutter level, and a third clutter level in a dynamic weather map cell corresponding to the current range cell is less than a third threshold.

Alternatively, in this case, the method may comprise using the no-land clutter path when a first clutter level in a clear day clutter map cell corresponding to the current range cell is less than a first threshold, a second clutter level in a dynamic day clutter map cell corresponding to the current range cell is greater than a second threshold plus the first clutter level, and a third clutter level in a dynamic weather map cell corresponding to the current range cell is greater than a third threshold and less than a fourth threshold.

The step of providing the first detection results may comprise:
   performing CFAR detection on the several input data sets to provide several CFAR outputs;
   processing the several CFAR outputs to select the largest CFAR output; and
   providing the first detection results by processing several selected largest CFAR outputs to indicate a detection when a minimum proportion of the several selected largest CFAR outputs indicate a detected target.

The CFAR detection may comprise employing the greatest of CFAR technique based on an early range with peak edited threshold, a late range average with peak edited threshold, a scaled dynamic clutter map value for pixel threshold, a digital sensitivity time control map based on minimum cross section threshold, and a geo-censor map threshold.

The method may further comprise performing one of magnitude conversion and power conversion for generating the several input data sets based on the several Doppler filter outputs.

The method may comprise using one of a clear Doppler filter bank, and a clutter Doppler filter bank to provide the several Doppler outputs, wherein the clear Doppler filter bank is used when the current range cell is at a range greater than a maximum transition range value at a corresponding azimuth segment in a transition range value table, otherwise the clutter Doppler filter bank is used.

The method comprises processing data based on the strongest of the several Doppler outputs prior to performing detection when the no-land-clutter path is used.

In a further aspect, at least one embodiment described herein provides a computer readable medium for processing input radar data to provide detection data, the computer readable medium comprising program code executable by a processor for implementing the method described above.

In a further aspect, at least one embodiment described herein provides a moving target detector for processing input data to perform detection for a current range cell, the moving target detector comprising: a Doppler filter bank module for processing the input data to provide several Doppler outputs for the current range cell; a no-land-clutter path for processing several input data sets related to the several Doppler outputs to provide second detection data by performing peak selection on each of the several input data sets and performing detection on the results of the peak selection; a land-clutter path for processing the several input data sets to provide first detection data by performing Constant False Alarm Rate (CFAR) detection on each of the several input data sets and merging the detection results; and a switching logic module for selecting one of the land-clutter path and the no-land-clutter path based on clutter information.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which.

DETAILED DESCRIPTION

Figure 1A:
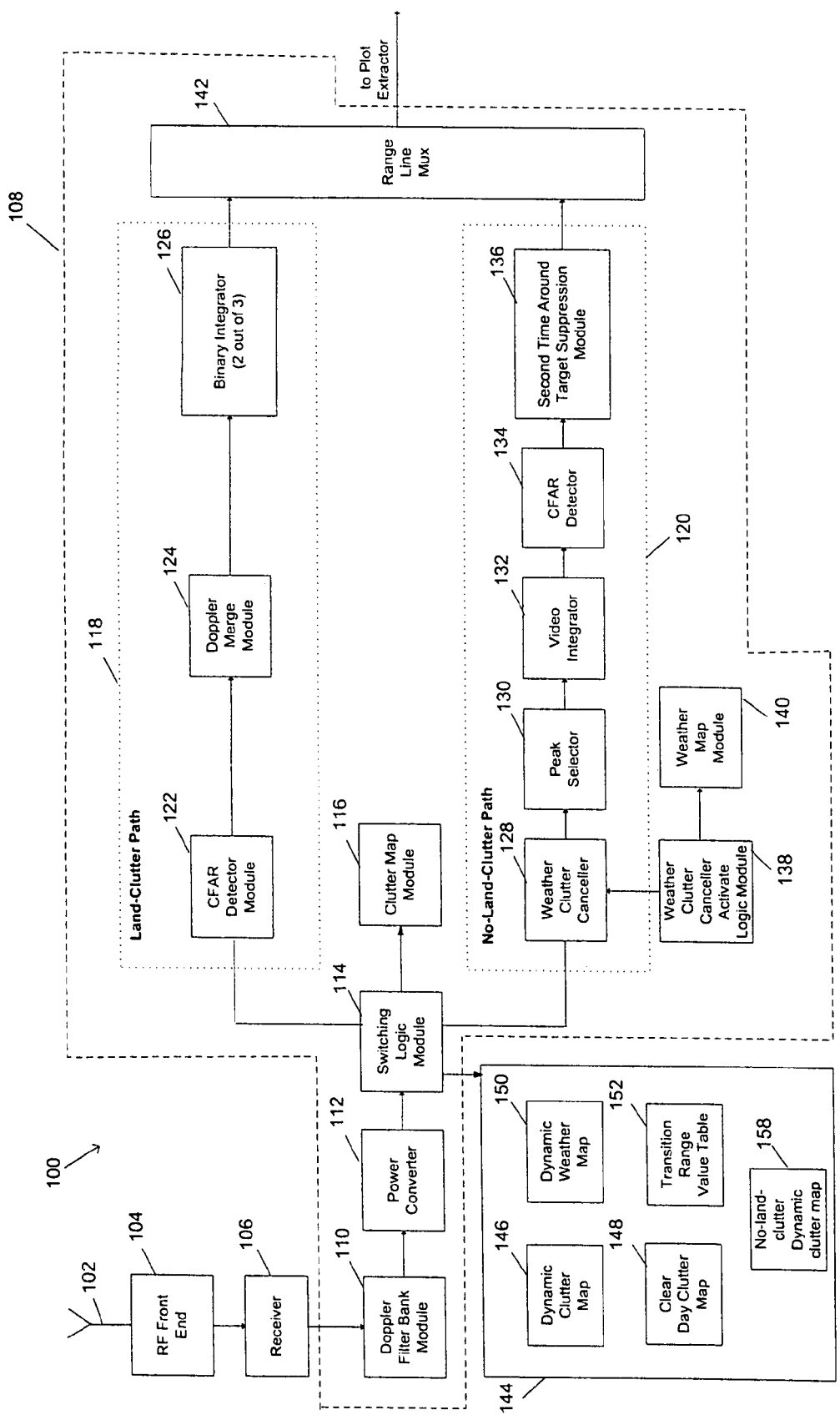
FIGS. 1A and 1B are block diagrams illustrating a portion of a radar system with exemplary embodiments of moving target detectors.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein.

Also, the description is not to be considered as limiting the scope of the embodiments described herein.

One aspect of the various embodiments for an MTD described herein is, for certain situations, the combination of Doppler data before CFAR detection. In practice, this can include the use of a video integrator, rather than a binary integrator, since a video integrator can provide more processing gain compared to a binary integrator (a binary integrator processes quantized data, and is simple but has less processing gain due to the loss of amplitude information for possible targets). In some cases, the processing gain can result in an increase of radar coverage or sensitivity on the order of 1.5 dB on average while the other benefits of a conventional MTD known by those skilled in the art are maintained. In order to achieve this processing gain, for certain situations, the video integrator is applied prior to CFAR detection, thereby allowing the video integrator to utilize the amplitude information of the targets. In the various embodiments described herein, it has been determined that in regions without land clutter, which is generally true for the far range, it is feasible to change the signal processing structure and replace the binary integrator with a more effective video integrator. In the various embodiments described herein, all or at least one of the following scenarios can be addressed such as: land-only clutter, weather-only clutter, clear (i.e. no land or weather clutter), combined clutter, PRF staggering, Anomalous Propagation (AP) and second time around return suppression.

Reference is now made to FIG. 1A, which illustrates a portion of a radar system 100 with an exemplary embodiment of a moving target detector (MTD) 108. The MTD 108 processes radar echo signals from different ranges adaptively. The radar system 100 comprises an antenna 102, an RF front end 104, a receiver 106, and the MTD 108. The radar system 100 also includes other downstream processing elements that are commonly known to those skilled in the art such as a plot extractor (not shown) and the like.

The MTD 108 comprises a Doppler filter bank module 110, a power converter 112, a switching logic module 114, a clutter map module 116, a land-clutter signal processing path 118, and a no-land-clutter signal processing path 120. The land-clutter path 118 comprises a CFAR detector module 122, a Doppler merge module 124, and a binary integrator 126. The no-land-clutter path 120 comprises a weather clutter canceller 128, a peak selector 130, a video integrator 132, a CFAR detector 134, and a second time around target suppression module 136. The MTD 108 further comprises a weather clutter canceller activate logic module 138, a weather map module 140, and a range line multiplexer 142. The MTD 108 can access a data store 144 that stores information related to clutter maps and transition values. In this exemplary embodiment, the data store 144 includes a dynamic clutter map 146, a clear day clutter map 148, a dynamic weather map 150, a transition range value table 152, and a no-land-clutter dynamic clutter map 158, which are described in further detail below.

Some of these blocks are optional in alternative embodiments. For instance, the second time around target suppression module 136 can be optional. Also, in some circumstances, the weather clutter canceller 128, the clutter canceller activate logic module 138 and the weather map module 140 can be optional, although without these elements, the performance of the MTD 108 may suffer in the presence of strong weather clutter. Further, depending on the implementation of some of the embodiments described herein, a map or table in the data store 144 can also be optional. In addition, the power converter 112 can be replaced by an amplitude converter (not shown).

Figure 2:
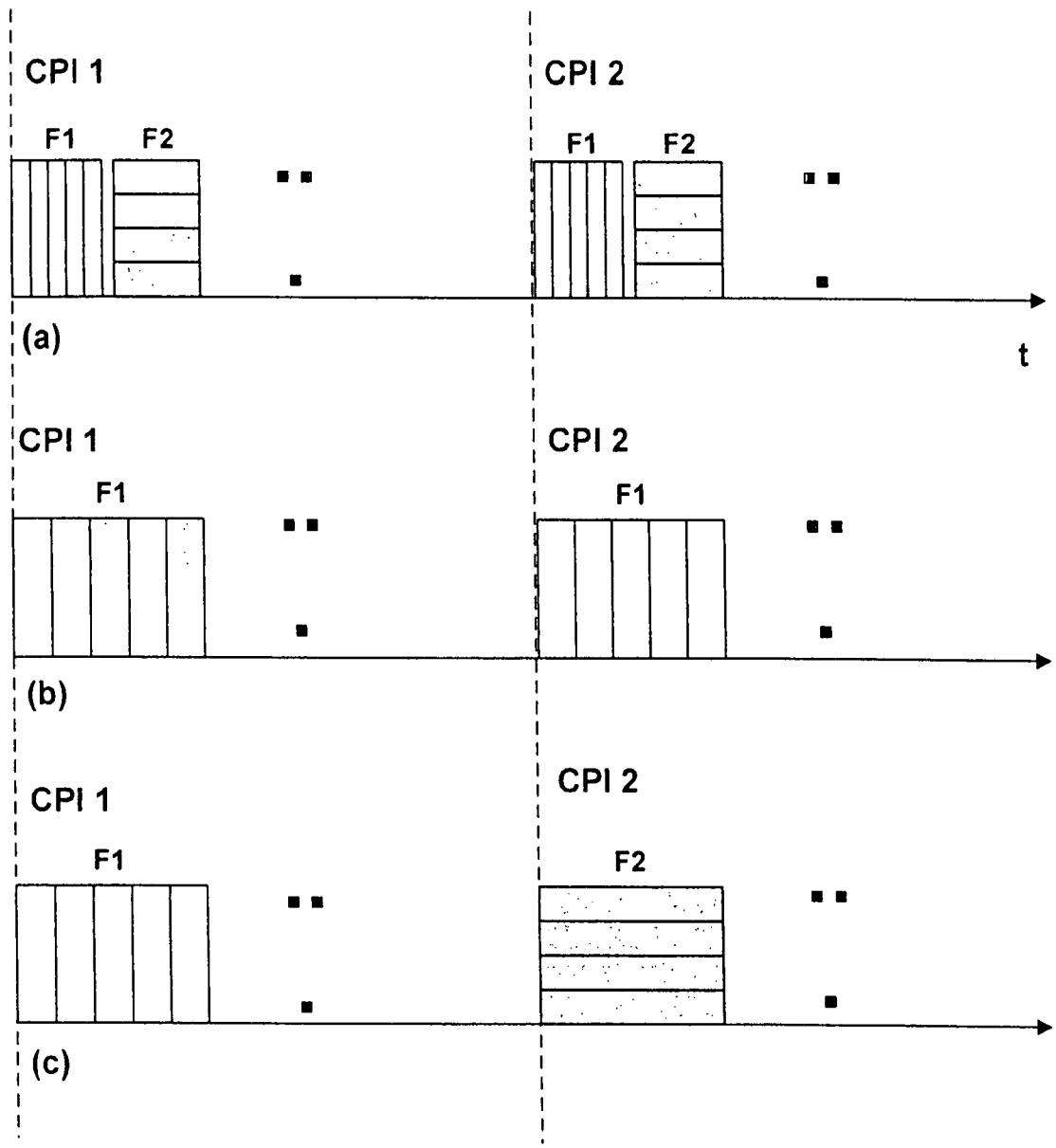
FIGS. 2A, 2B and 2C illustrate exemplary waveforms that can be used for the radar pulses that are transmitted by the radar system of FIGS. 1A and 1B.

The MTD 108 is not restricted by the type of transmitter (not shown) and the antenna 102 that is employed. The MTD 108 can be combined with either a solid-state transmitter or a tube transmitter, along with either a scanning antenna or phased array antenna. If the same antenna is used for both transmission and reception, then a duplexer (not shown) can be used. Various waveforms can be used for generating the transmitted radar pulses such as simple unmodulated waveforms and modulated complex waveforms such as nonlinear FM waveforms as well as other waveforms as is commonly known by those skilled in the art. However, for exemplary purposes, the MTD 108 is described herein as using simultaneous dual frequency operation (see FIG. 2A for example), which means that within each pulse repetition interval (PRI), two pulses are transmitted at carrier frequencies F1 and F2, respectively. The PRI is assumed to be constant for n consecutive pulses that form one coherent processing interval (CPI). There can be m CPIs available within each 3 dB one-way azimuth beamwidth, which are integrated to enhance target detection. Further, the PRI of each carrier frequency can be changed after each CPI to combat the blind speed problem. However, the MTD 108 is not restricted to this particular waveform, and can work with simplex frequency operation (see FIG. 2B, for example), sequential dual frequency operation (see FIG. 2C, for example) as well as other suitable waveforms. The MTD 108 can also work with a constant PRI across CPIs.

After the radar pulses are transmitted by the transmitter (not shown), reflections of these radar pulses are received by the antenna 102 and processed by the RF front end 104 and the receiver 106. The RF front end 104 typically includes protection circuitry, sensitivity time control (STC), one or more filters and amplifiers to pre-process the radar data as is commonly known by those skilled in the art. The RF front end 104 provides the pre-processed radar data to the receiver 106, which provides further processing to produce range-azimuth radar data. The receiver 106 typically includes components for mixing, sampling, filtering and downsampling such as a two-stage heterodyne mixer, an analog to digital converter, and digital and analog filters, as is commonly known by those skilled in the art. The receiver 106 can also include a pulse compressor or matched filter that has a transfer function or impulse response that is matched to the transmitted radar pulses. The data from the matched filter is then separated into CPIs for analysis in which the data is range-aligned to provide the range-azimuth (pulse) data. The range information in the range-azimuth data provides an estimate of a possible target's distance from the antenna 102. The azimuth information in the range-azimuth data provides an estimate of the angle of the possible target's location with respect to the center of the antenna 102. Those skilled in the art are familiar with this processing performed by the various receiver elements mentioned above and the order of this processing.

The range-azimuth data is provided as input data to the Doppler filter bank module 110, which processes the input data to provide several Doppler outputs each including range-Doppler-azimuth data. The Doppler information in the range-Doppler-azimuth data provides an estimate of a possible target's radial velocity by measuring the possible target's Doppler shift, which is related to the change in frequency content of a given radar pulse that is reflected by the possible target with respect to the original frequency content of the given radar pulse. The several Doppler outputs can be processed by the remainder of the MTD 108 on a range cell basis, i.e. the range-Doppler-azimuth cell for the current range cell that is being processed by the MTD 108. A range cell is a cell on a range-azimuth plot between certain azimuth and range values, for example i.e. between 0 and 5 degrees and 10 and 11 nautical miles.

In this exemplary embodiment, different banks of Doppler filters can be used to process data depending on whether there is a clutter background or a clear background. The MTD detector 108 can adapt to the local clutter level by automatically selecting between two available Doppler filters banks: a clutter Doppler filter bank 172 and a clear Doppler filter bank 174 (see FIG. 1C). The clutter Doppler filter bank 172 can be used to maximize clutter rejection and subclutter visibility (SCV), whereas the clear Doppler filter bank 174 can be used to maximize sensitivity by reducing mismatch and scalloping loss. Switching to the clear Doppler filter bank 174 can provide an additional 1.8 dB of sensitivity at ranges beyond those at which there is any clutter. A filter bank selection module 170 can be used to select one of the Doppler filters banks 172 and 174 by using several different methods, one of which involves accessing information in the transition range value table 152. In an alternative embodiment, the Doppler filter bank module 110 can include a single bank of Doppler filters.

For each azimuth segment, the MTD 108 can maintain one or more transition range values in the transition range value table 152, which in one aspect, can be used to select one of the Doppler filter banks 172 and 174. An azimuth segment is one sector of a radar scan (i.e. all range cells for a given azimuth segment such as 0 to 1.5 degrees, for example). When one transition range value is used for an azimuth segment in the transition range value table 152, the clutter Doppler filter bank 172 can be used below this transition range value, and the clear Doppler filter bank 174 can be utilized above this transition range value (i.e. the transition range value for transitioning between the filter banks 172 and 174 can be set to the largest range value at which the clutter exceeds a reference or threshold value). However, in an alternative embodiment, there can be several transition range values for a given azimuth segment so that the transition between the Doppler filter banks 172 and 174 can occur more than once.

The transition range values in the transition range value table 152 can be dynamically updated to adapt to the clutter independently for each azimuth segment based on the updated clutter values that are stored in the dynamic clutter map 146. The clutter map module 116, or another element of the MTD 108, can perform this update. For instance, as the clutter changes, the clutter map module 116 can update the dynamic clutter map 146, and can readjust the values in the transition range value table 152 to account for the changes in clutter. This update can be performed on every radar scan, or in a periodic fashion based on time (i.e. every hour, day, week, etc.) or according to some other suitable criteria. The new data at the zero-Doppler filter output can be used to update the dynamic clutter map 146 through a recursive filter that averages the data over several scans. In an alternative embodiment, there can be more than one dynamic clutter map, which are updated based on the non-zero Doppler filter outputs as well. For example, in some cases, if there is enough memory, there can be a dynamic clutter map for each Doppler filter, which can significantly increase the CFAR detection performance for each filter output. In each case, the data for updating the dynamic clutter map 146 can be provided by the output of the power converter 112.

Rather than using the filter bank selection module 170 to check the transition range value table 152 to select one of the clutter and clear Doppler filter banks 172 and 174, another element of the MTD 108 can provide this functionality, such as the switching logic module 114 (this connection is not shown), in which case the filter bank selection module 170 is not needed. In an alternative embodiment, a larger number of Doppler filter banks may be used, each for a particular condition. In addition, in an alternative embodiment, other criteria than that described here may be used to switch between the various Doppler filter banks provided in the Doppler filter bank module 110.

Figure 3A:
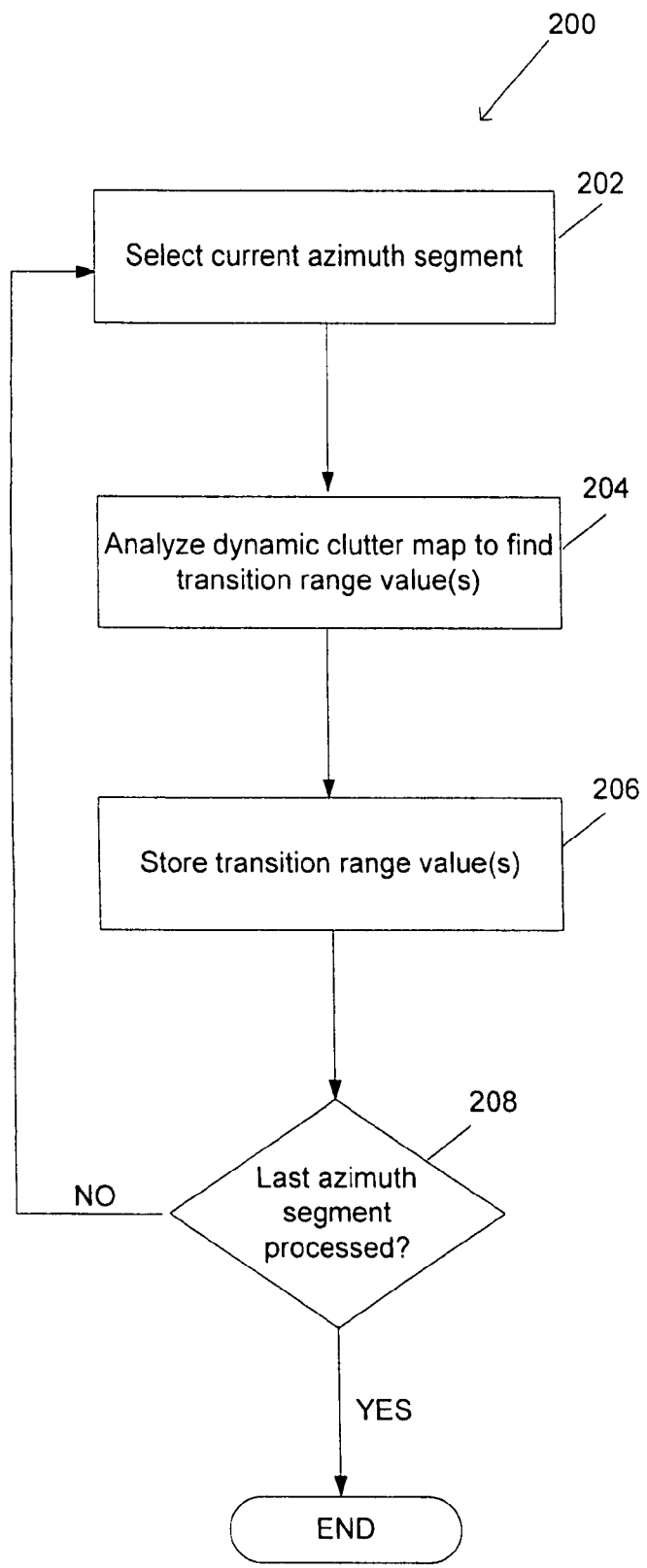
FIG. 3A is a flowchart illustrating an exemplary embodiment of a method that can be employed by the MTDs of FIGS. 1A and 1B for generating a transition range value table that can be used for various purposes.

Referring now to FIG. 3A, shown therein is a flowchart illustrating an exemplary embodiment of a method 200 that can be employed by the MTD 108 for generating the transition range value table 152. The method 200 begins with the selection of the current azimuth segment. When the method 200 first starts, the current azimuth segment can be initialized to some initial azimuth segment, otherwise the current azimuth segment is updated in a suitable manner; for instance, the azimuth segments can be processed in a clockwise or counter-clockwise manner. At step 204, the dynamic clutter map 146 is analyzed to find a transition range value according to some transition criteria. For instance, the range values in which there is a transition to below a threshold value for the current azimuth segment can be further processed and selected for storage in the transition range value table 152. For instance, the largest of these range values (i.e. the maximum transition range value that is farthest from the radar system 100) can be selected for storage in the transition range value table 152. Alternatively, all of these transition range values can be selected for storage in the transition range value table 152. Other suitable criteria can be used to select these transition range values for storage in the transition range value table 152. At step 206, the selected transition range value(s) is stored in the transition range value table 152 for the current azimuth segment. If step 208 determines that the last azimuth segment has been analyzed (i.e. the table 152 is fully populated), then the method 200 ends, otherwise the method 200 proceeds to step 202.

Figure 3B:
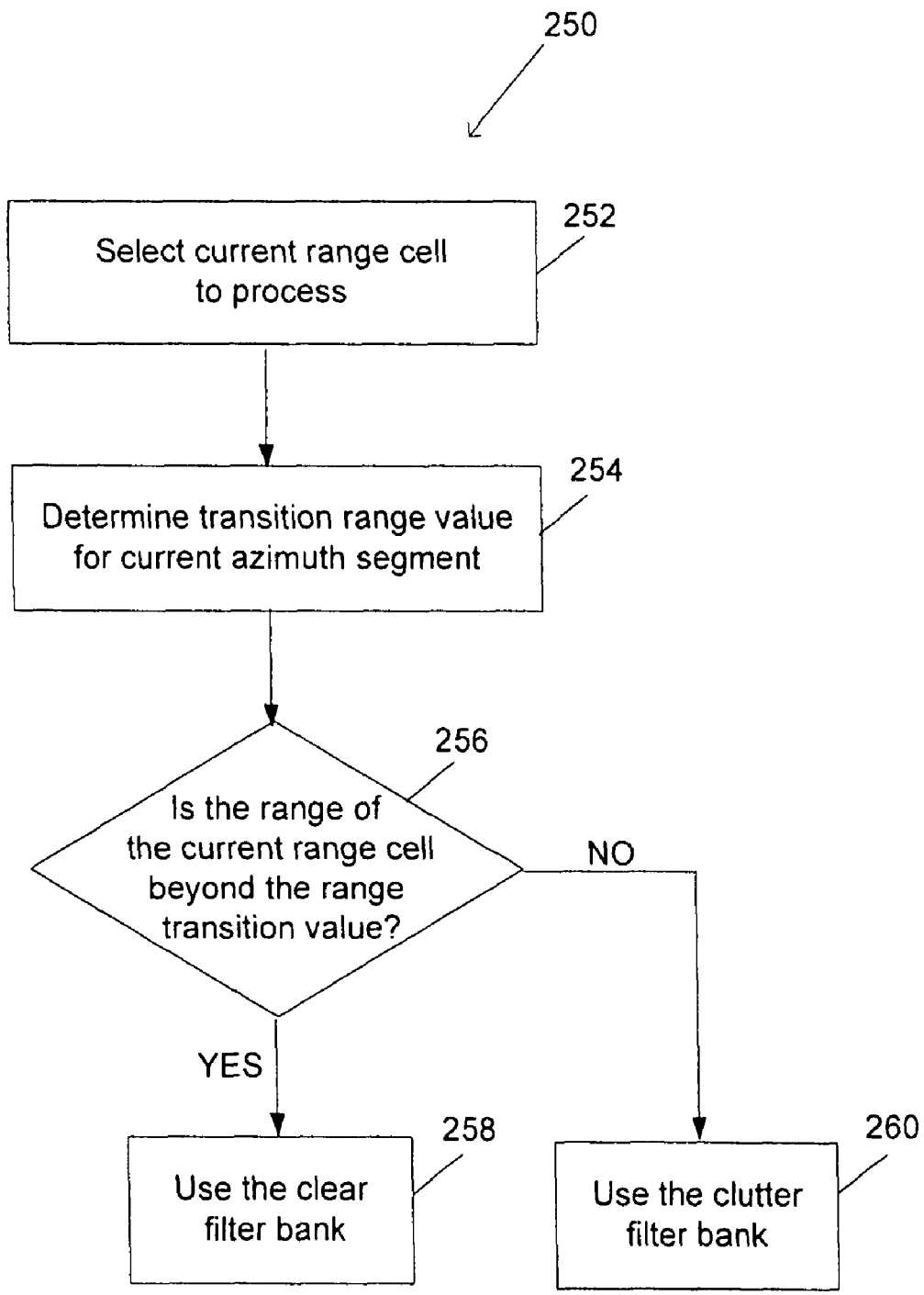
FIG. 3B is a flowchart illustrating an exemplary embodiment of a method that can be employed by the MTDs of FIGS. 1A and 1B when determining which Doppler filter bank to use.

Referring now to FIG. 3B, shown therein is a flowchart illustrating an exemplary embodiment of a method 250 that can be employed by the MTD 108 to select one of the Doppler filter banks 172 and 174 during operation. At step 252, the current range cell to process is selected. If the method 250 has just started, then the current range cell can be initialized and thereafter on successive iterations of the method 250 the next range cell can be selected in an appropriate matter such as progressively increasing range for a given azimuth segment until the furthest range cell, then incrementing the azimuth segment and starting at the nearest range cell and continuing in a likewise fashion. At step 254, the transition range value for the current azimuth is determined from the transition range value table 152. At step 256, the method 250 determines whether the range value of the current range cell is greater than (i.e. beyond) the transition range value. If so, then the clear Doppler filter bank 174 is selected to process the radar data for the current range cell. If not, then the clutter Doppler filter bank 172 is selected to process the radar data for the current range cell.

In an alternative embodiment, if there are several transition range values for a given azimuth segment, then step 256 of method 250 can be altered to determine where the current range cell is (its range) relative to the transition range values. The first transition range value signifies a transition from using the clutter Doppler filter bank 172 to the clear Doppler filter bank 174, while the second transition range value signifies a transition from using the clear Doppler filter bank 174 to using the clutter Doppler filter bank 172, and so on an so forth. Accordingly, in this alternative embodiment, if the range value of the current range cell is larger than an odd number of transition values, then the clear Doppler filter bank 174 is selected. Alternatively, if the range value of the current range cell is larger than an even number of transition values, then the clutter Doppler filter bank 172 is selected.

The dynamic clutter map 146 can be created by smoothing the outputs of the Doppler filter bank module 110 to estimate the average clutter for each range-azimuth cell as described previously. The dynamic clutter map 146 can be updated from scan to scan or at a slower rate. In general the dynamic clutter map 146 can employ an individual cell size of one range resolution cell by one beamwidth or less. Its overall coverage typically extends to full range and 360 degrees. The dynamic clutter map 146 can be used for several purposes:

1) to enable the detection of tangential targets with large cross-sections and to prevent clutter residue at the output of the Doppler filter bank module 110 from being detected in CFAR detection;
2) to select either the clutter Doppler filter bank 172 or the clear Doppler filter bank 174; and
3) to choose one of the no-land-clutter path 120 and the land-clutter path 118 as discussed further below.

Anomalous Propagation (AP) is a phenomenon due to atmospheric ducting that causes clutter to appear from ranges beyond the maximum unambiguous range of the radar system 100. In EnRoute radar or Long Range radar systems, this phenomenon is less common compared to that in airport surveillance radar systems. Under an AP situation, the radar returns from land clutter are missing for one or more of the first pulses of a given CPI, which reduces the sensitivity of the radar system 100. The combination of CFAR detection, binary integration and variable PRF reduces false alarms due to AP. However, the sensitivity of the radar system 100 is reduced when clutter does not appear in all of the processed radar returns, because of the residues that are produced in all the Doppler filters in the Doppler filter bank module 110.

To mitigate the effects of AP, in an alternative embodiment, the Doppler filter bank module 110 can include a third Doppler filter bank (not shown) which can be applied when AP is detected. Alternatively, in another embodiment, the MTD 108 can include an AP processing module (not shown) to tailor the processing window in the third Doppler filter bank in each AP region (i.e. each region that is affected by AP). When AP causes strong second time around clutter, the processing window can be configured to use fewer pulse returns in each CPI than that which would be normally used. The type of AP processing can further be adjusted depending on the azimuth segment. In operation, for both of these embodiments, either automatic AP detection logic or manual activation can be employed to determine when the additional AP processing is required to address AP. However, the embodiments described herein can work with or without this AP processing, although performance might be degraded in an AP region when there is no AP processing.

The Doppler filters in the Doppler filter bank module 110 can operate over a CPI of n pulses at a common pulse repetition frequency (PRF). The value selected for n is a tradeoff between coherent processing gain and diversity of PRFs or dim speed. Also, for the clear Doppler filter bank 174, the mismatch and scalloping loss can be minimized in order to achieve the maximum possible integration gain. The side lobes in the frequency response are not a concern due to the lack of clutter. The clear Doppler filter bank 174 can be configured so that the loss can be negligible. For instance, interpolated filters can be utilized in the clear Doppler filter bank 174. As an example, if there are 5 pulses within each CPI (n=5), the mismatch and scalloping loss can be reduced to near 0 dB by using 25 filters in the clear Doppler filter bank 174.

After the Doppler filter processing provided by the Doppler filter bank module 110, the MTD 108 has two signal processing chains or paths, the no-land-clutter path 120 and the land-clutter path 118 that are selected based on information provided by at least one clutter maps. The switching logic module 114 is configured to choose between these two paths 118 and 120 based on whether there is land clutter or not for the current range cell that is being processed based on clutter information. The clutter information can be based on at least one of the clutter maps 146, 148 and 150 or indirectly from the transition range value table (which was calculated using clutter information). For instance, the decision can be made adaptively based on the clear day clutter map 148, the dynamic clutter map 146, the combination of these two clutter maps 146 and 148 as well as possibly another clutter map, as described below. Alternatively, any other appropriate technique based on clutter information can be used which serves this purpose. Accordingly, it should be understood that the embodiments described herein are not restricted by the type of switching logic employed by the switching logic module 114.

Figure 4A:
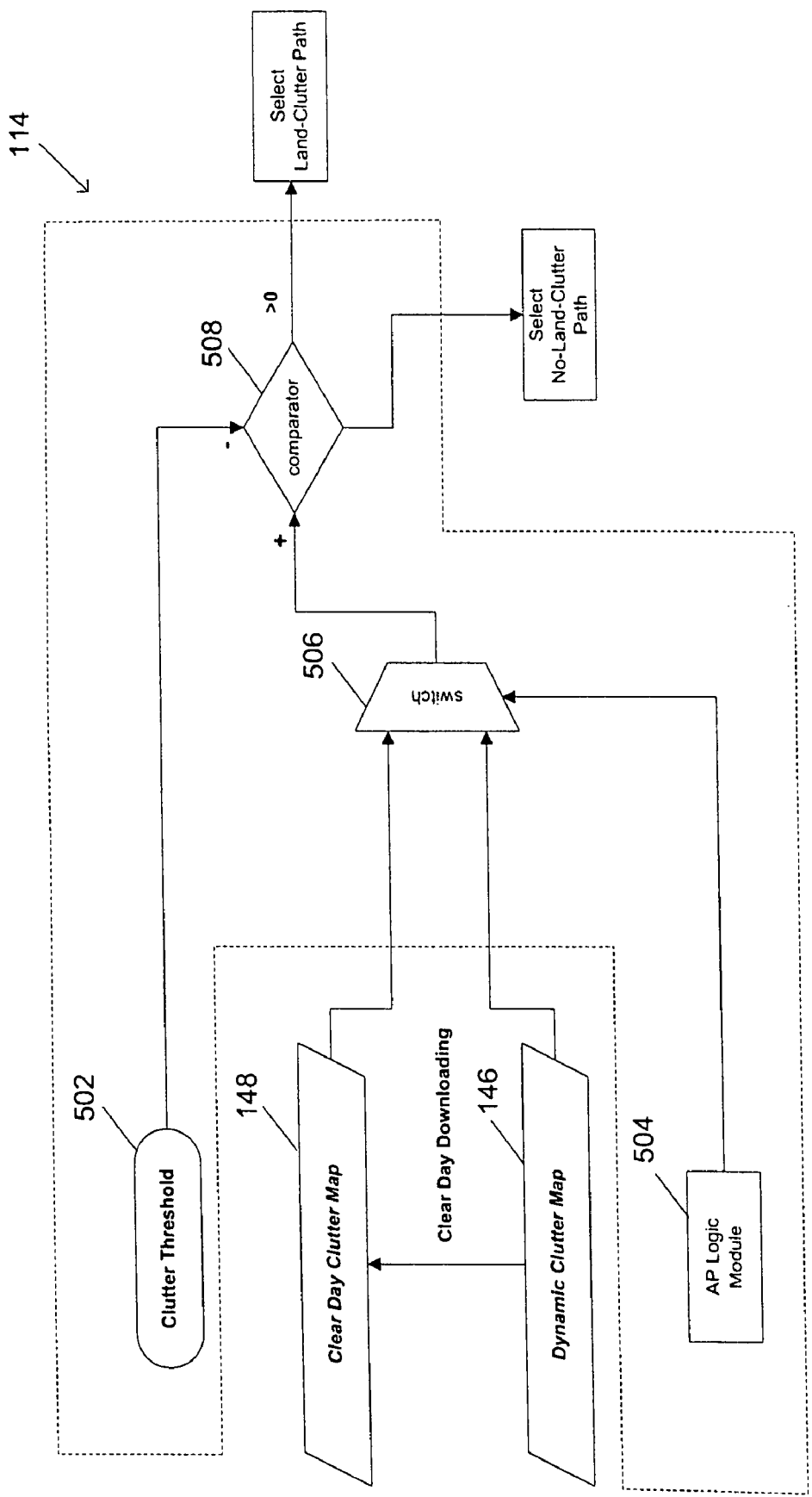
FIG. 4A is block diagram illustrating an exemplary embodiment of a switching logic module that can be used by the MTDs of FIGS. 1A and 1B for selecting a signal processing pathway.

Referring now to FIG. 4A, shown therein is a block diagram illustrating an exemplary embodiment of a switching logic module 114. The switching logic module 114 includes a clutter threshold 502, an AP logic module 504, a switch 506, and a comparator 508. The clear day clutter map 148, and the dynamic clutter map 146 are used as inputs for the switch 506. The dynamic clutter map 146 can be generated by the clutter map module 116 by recording the range-azimuth radar data that is provided by the receiver 106 for each range cell. The clear day clutter map 148 can be generated from the dynamic clutter map 146 periodically (such as monthly or seasonally) by downloading the dynamic clutter map 146 on a known clear day when there is no significant weather clutter within the dynamic clutter map 146. The value for the clutter threshold 502 is selected for a given azimuth segment. Accordingly, the clutter threshold 502 can be used to adapt to the clutter independently for each azimuth segment. The clutter threshold 502 can be a fixed value for a given azimuth that can be set a few dB above the clutter level that is expected for the no-land clutter case. One exemplary threshold can be the thermal noise level plus 10 dB.

The path selection is based on the clear day clutter map 148 when the AP logic module 504 does not detect the occurrence of AP or when the AP logic module 504 is manually turned off by an operator of the radar system 100. The path selection can be based on the dynamic clutter map 146 when the AP logic module 504 detects AP. The clutter level in a cell of the chosen clutter map that corresponds to the current range cell that is being processed is compared to the clutter threshold 502. If this clutter level is higher than the clutter threshold 502, then the land-clutter path 118 is selected. If the clutter level is lower than the clutter threshold 502, then the no-land-clutter path 120 is selected. Those skilled in the art are aware that the AP logic module 504 can be implemented in various ways.

Typically, the clear day clutter map 148 is chosen under normal circumstances in order to avoid any side effects from weather clutter. Specifically, the dynamic clutter map 146 may have strong weather clutter that shows up at far ranges for some azimuth segments. This strong weather clutter may be mistaken for land clutter by the MTD 108. This in turn, may cause the MTD 108 to process the radar data for the current range cell using the land-clutter path 118, when it would be more appropriate to process the radar data using the no-land-clutter path 120. Accordingly, it is more appropriate to use the clear day clutter map 148 under such circumstances since the no-land-clutter path 120 can provide a greater signal processing gain than the land-clutter path 118 in these circumstances. The AP logic module 504 can be configured to be immune from clutter due to weather by using methods known to those skilled in the art, such that the AP logic module 504 correctly chooses the clear day clutter map 148 when there is no AP even in the presence of weather clutter.

When AP occurs, the dynamic clutter map 146 is chosen since the land clutter might show up at far range values due to ducting. Under such circumstances, the clutter map module 116 can recognize the existence of the abnormal land clutter, and generate the dynamic clutter map 146 so that the decision can be appropriately made to process the signal returns from these land clutter regions with the land-clutter path 118. The clear day clutter map 148 does not reflect these changes due to ducting. Therefore, in this case, a wrong decision may occur based on the clear day clutter map 148, which means that the signal returns from targets in the abnormal land clutter region might be processed in the no-land-clutter path 120 and might not be detected properly.

Figure 4B:
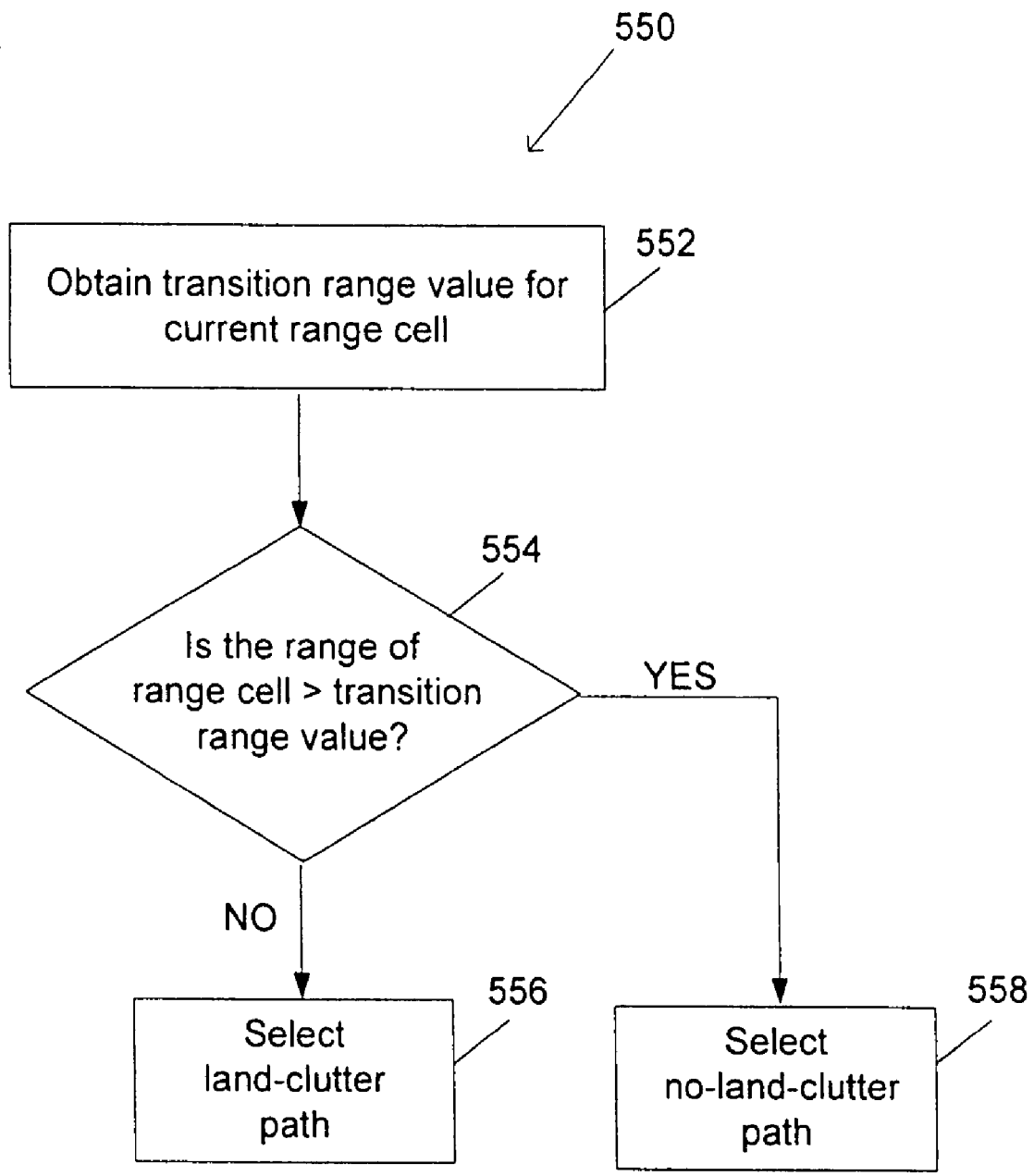
FIGS. 4B-4C are flowcharts illustrating exemplary embodiments of methods that can be used by the MTDs of FIGS. 1A and 1B for selecting a signal processing pathway.

Referring now to FIG. 4B, shown therein is a flowchart illustrating an exemplary embodiment of a method 550 that can be alternatively used by the switching logic module 114 for selecting one of the signal processing paths 118 and 120. At step 552, the transition range value is obtained from the transition range value table 152 for the current range cell that is being processed. This is done based on the azimuth value of the current range cell. The range value of the current range cell being processed is then compared with the transition range value at step 554. If the range value of the current range cell is larger than the transition range value, then the no-land-clutter path 120 is selected at step 558. If this is not the case, then the land-clutter path 118 is selected at step 556.

The transition range values in the transition range value table 152 can be selected to be the longest range value at which the clutter exceeds a preset threshold. In other words, all the range cells beyond the transition range value have low enough clutter levels to allow the use of the no-land-clutter path 120. The transition range table 152 can be generated by obtaining these range transition values, as described previously, based on the clear day clutter map 148 or the dynamic clutter map 146. The selection of the clutter map used can be based on the detection of AP as described above.

Alternatively, as described for selecting between the clutter and clear Doppler filter banks 172 and 174, several transition range values can be stored in the transition range value table 152 for transitioning between the selection of the signal processing paths 118 and 120. In this case, the method 550 can be modified so that the no-land-clutter path 120 is selected when the range value of the current range cell being processed is larger than an odd number of the transition range values for the corresponding azimuth segment; otherwise the land-clutter path is selected 118.

Figure 4C:
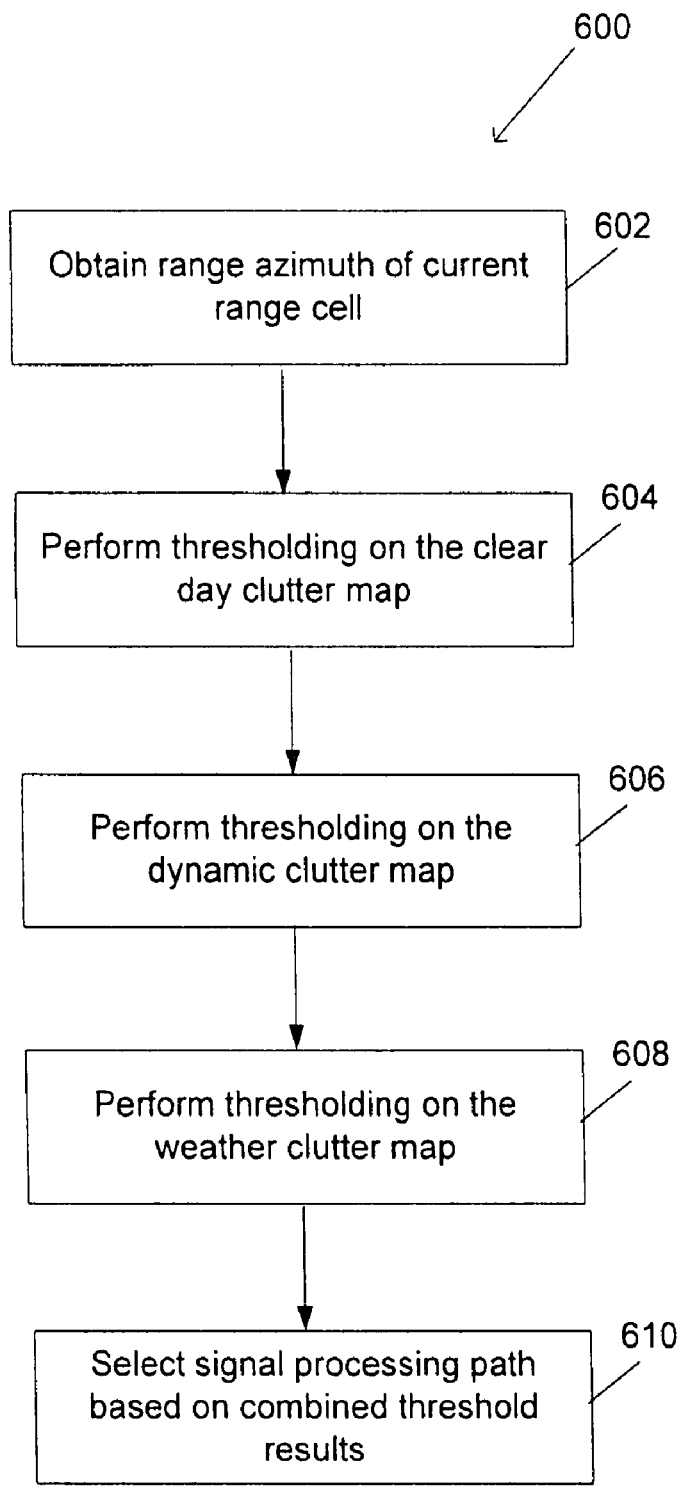

Referring now to FIG. 4C, shown therein is a flowchart illustrating an exemplary embodiment of a method 600 that can be alternatively used by the MTD 108 for selecting one of the signal processing paths 118 and 120. At step 602, the range and azimuth of the current range cell being processed is obtained. At step 604, the clutter in the cell of the clear day clutter map 148 that corresponds to the current range cell is compared to a first threshold thr1. The result is encoded as a 0 if the clutter is less than the first threshold thr1; otherwise the result is encoded as a 1. At step 606, the clutter in the cell of the dynamic clutter map 146 is compared to a second threshold comprising a constant thr2 plus the clutter level in the corresponding cell of the clear day clutter map 148. The result is encoded as a 0 if the clutter is less than the second threshold; otherwise the result is encoded as a 1. At step 608, the clutter in the cell of the dynamic weather map 150 is compared to third and fourth thresholds thr3 and thr4. The result is encoded as a 0 if the clutter is less than the third threshold thr3, a 1 if the clutter is between the third threshold thr3 and the fourth threshold thr4, or a 2 if the clutter is larger than the threshold thr4.

At step 610, one of the signal processing paths 118 and 120 is selected based on the combined threshold results according to certain rules. For example, the no-land clutter path 120 is selected if the results of each threshold operation is 0. The no-land clutter path 120 is also selected if the result of the threshold on the clear day clutter map is 0, and the remaining threshold results are 1. For other combinations of the threshold results, the land-clutter path 118 can be selected.

Figure 5:
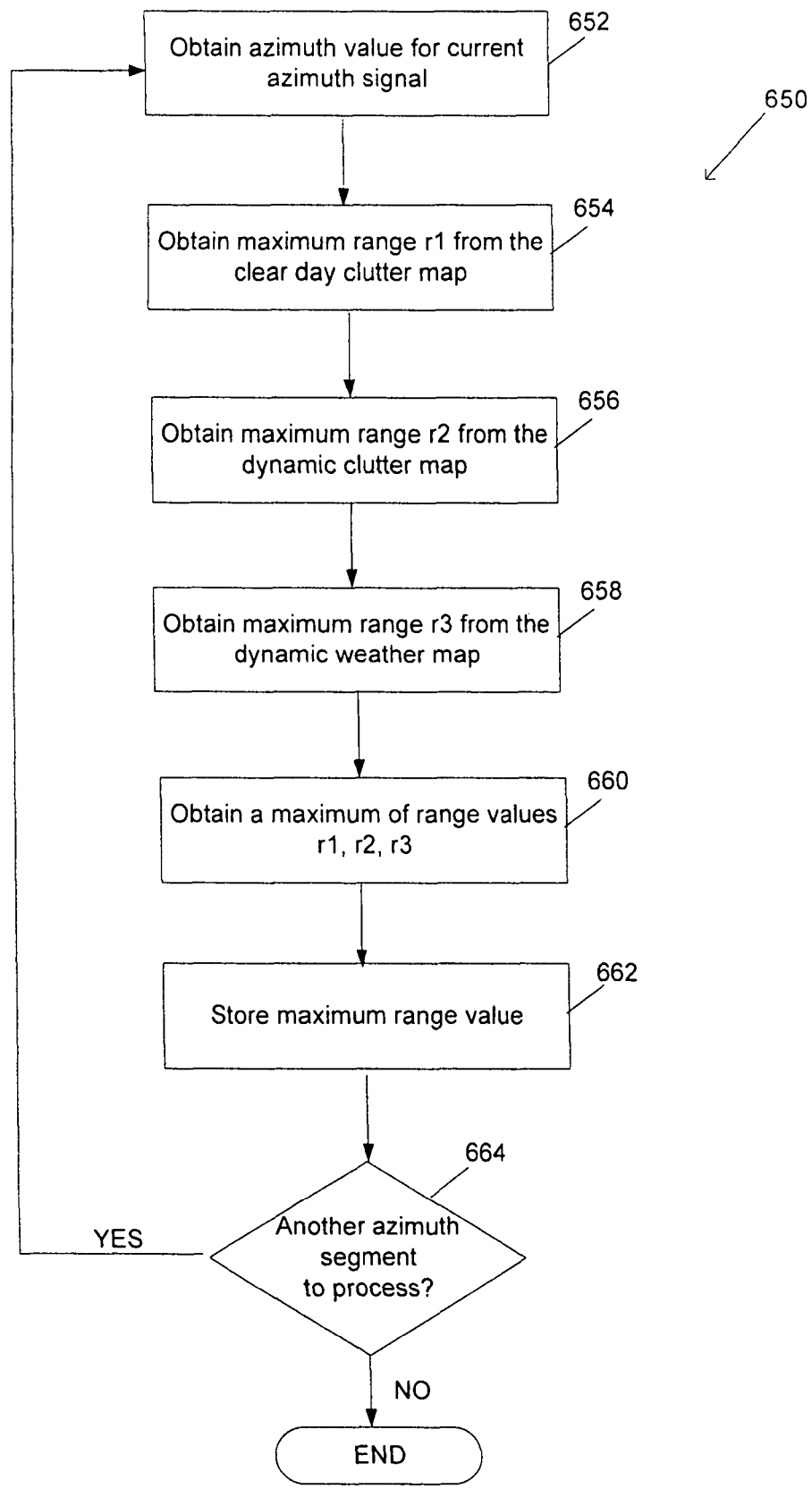
FIG. 5 is a flowchart illustrating an alternative exemplary embodiment for selecting a range transition value for use in selecting a signal processing pathway or the selection method of FIG. 3B.

Referring now to FIG. 5, shown therein is a flowchart illustrating an exemplary embodiment of a method 650 that can be alternatively used by the MTD 108 to generate values for the transition range value table 152. At step 652, the azimuth value for the current azimuth segment is obtained. At step 654, the maximum range value r1 from the clear day clutter map 148 for the current azimuth segment is obtained by finding the maximum range value in which the clutter is larger than a first threshold threshold1. At step 656, the maximum range value r2 from the dynamic clutter map 146 for the current azimuth segment is obtained by finding the maximum range value in which the clutter is larger than a second threshold threshold2 plus the amount of clutter at the range value r2 in the clear day clutter map 148. At step 658, the maximum range value r3 from the dynamic weather clutter map 150 for the current azimuth segment is obtained by finding the maximum range value in which the clutter is larger than a third threshold threshold3. At step 660, the maximum of the maximum range values r1, r2 and r3 is obtained, and at step 662 this maximum range value is stored in the transition range value table 152. This maximum range value can be used in the selection of the clutter and clear Doppler filters 172 and 174 as well as the land-clutter and no-land-clutter signal processing paths 118 and 120. At step 664, if the method 650 determines that there is another azimuth segment to process, the current azimuth segment is updated and the method 650 moves to step 652; otherwise the method 650 ends.

The several Doppler outputs from the Doppler filter bank module 110 are subjected to thresholding by a CFAR detector. When the land-clutter path 118 is chosen, the output of the power converter 112 is subjected to CFAR detection, then to a combining process by the Doppler merge module 124. When the no-land-clutter path 120 is chosen, the output of the power converter 112 is peak selected and then video integrated before being processed by the CFAR detector 134. In this case, video integration is feasible due to the fact that the data is relatively free of land clutter. For this scenario, video integration is more efficient than binary integration and in some cases has been shown to provide 1.5 dB more sensitivity on average. Typically, the no-land-clutter path 120 will be provided with data from the clear Doppler filter bank 174. However, when there is heavy weather clutter leaking into the zero Doppler range, the no-land-clutter path 120 will be provided with data from the clutter Doppler filter bank 172. In either case, the Doppler filter bank module 110 will provide several Doppler outputs (one for each Doppler filter that is employed). The power converter 112 will then provide the power of the several Doppler filter outputs (i.e. $I^2+Q^2$ for each data sample) to generate several input data sets that are processed by one of the paths 118 and 120. Accordingly, the power converter 112 generally provides the same number of outputs as the Doppler filter bank module 110. In embodiments in which a magnitude converter (not shown) is used rather than the power converter 112, the magnitude of the Doppler filter outputs (i.e. $(I^2+Q^2)^{1/2}$ for each data sample) is provided. In either case, the power or the magnitude of the Doppler filter outputs is a real-valued data series.

When there is no significant weather clutter, the weather clutter canceller 128 is not activated, and the maximum input data set corresponding to the maximal Doppler output of the Doppler filter bank module 110 is selected by the peak selector 130 to provide peak output data. The peak output data is then video integrated over several CPIs. In other words, the p independent outputs of the Doppler filter bank module 110 are ranked according to their power and the strongest one is kept. Accordingly, when there is no land or weather clutter, the peak selector 130 will pick the strongest target among all the outputs of the Doppler filter banks module 110. In addition, the PRF may be changed from CPI to CPI in order to eliminate blind speed. If PRF stagger is applied, for any two consecutive CPIs, the target might show up in the outputs of two different Doppler filters due to PRF stagger, however, the output with the target will be consistently selected, which makes the following video integration across CPIs feasible.

When there is weather clutter, the peak selector 130 may not function as well since the weather clutter may dominate at least one of the Doppler outputs of the Doppler filter bank module 110 and one of these weather-contaminated Doppler outputs may be peak selected when another of the Doppler outputs may contain a possible target. Under such circumstances, the weather clutter canceller 128 is activated by the weather clutter canceller activate logic module 138 to suppress the weather clutter from the input data sets before peak selection by the peak selector 130. The weather clutter canceller activate logic module 138 can examine the clutter in the dynamic weather map 150 to determine if the weather clutter is higher than a weather clutter threshold; if so the weather clutter canceller 128 is activated, which suppresses the weather clutter in the input data sets while keeping the target to noise ratio intact. The weather map module 140 generates the dynamic weather map 150 and can update the dynamic weather map 150 in an ongoing basis. This update can be performed on every radar scan, or in a periodic fashion based on time (i.e. every hour, day, week, etc.) or according to some other suitable criteria.

Figure 6:
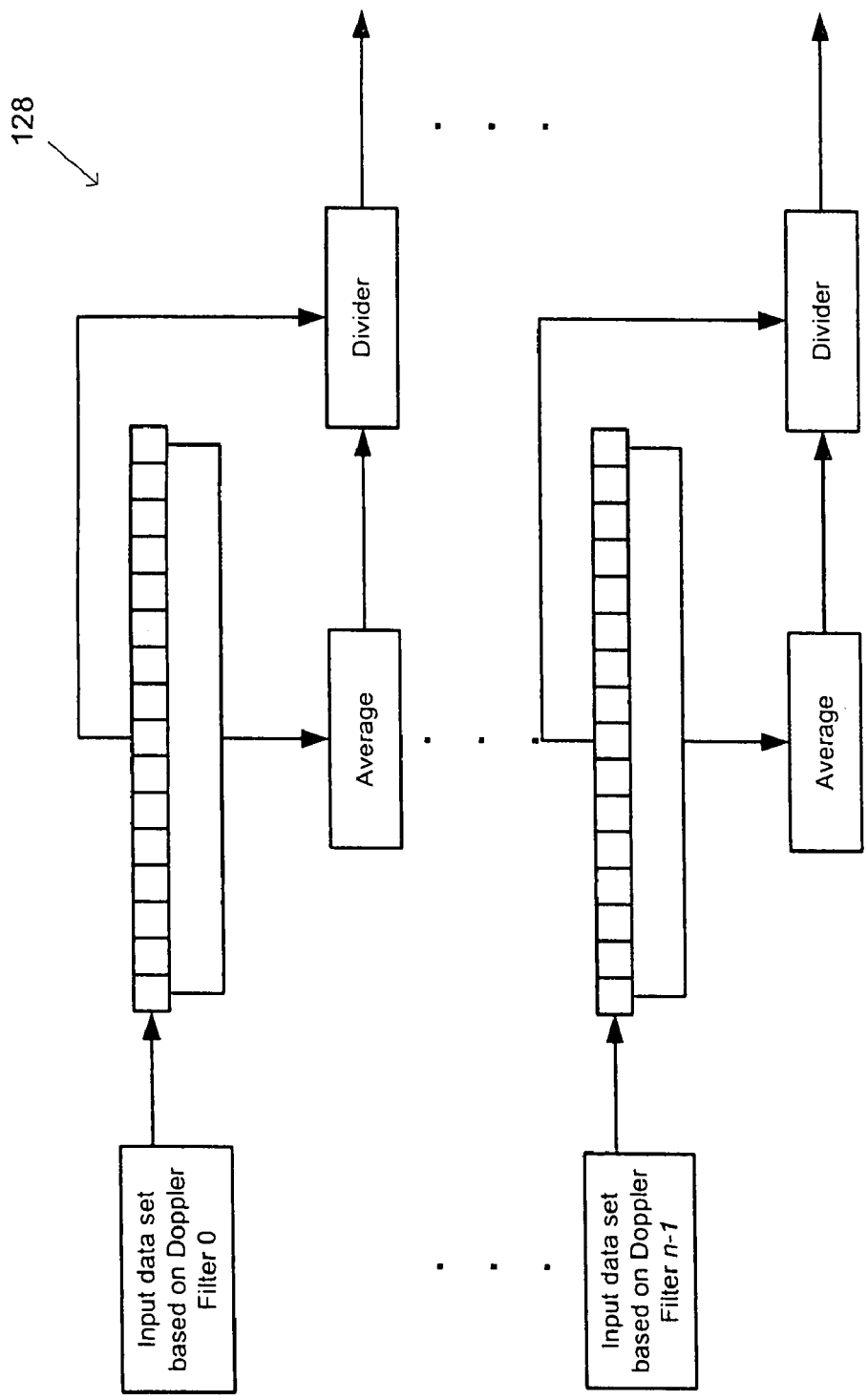
FIG. 6 is a diagram of an exemplary illustration of processing that can be performed by a weather clutter canceller that can be used by the MTDs of FIGS. 1A and 1B.

Referring now to FIG. 6, shown therein is a diagram of an exemplary embodiment of the processing that can be performed by the weather clutter canceller 128. However, it should be understood that the weather clutter canceller 128 can be implemented in other ways. For a given input data set, which originated from one of the Doppler filters of the Doppler filter bank module 110, the input data set is normalized by the average value of the processed output over the given range extent window. This normalization process has the effect of suppressing weather clutter in the input data set in that the weather clutter is spatially uniform. This normalization is conducted for every range cell within weather clutter. It is similar to Cell Averaging (CA) CFAR but without thresholding.

The peak output data of the peak selector 130 can be video integrated for m consecutive CPIs in a sliding window fashion. The video integrator 132 processes the power of the peak output data by adding them together to obtain video integrated data. The output of peak selector 130 for several consecutive CPIs, for example three consecutive CPIs, can be added in power to obtain the video integrated data. For any implementation in the video integrator 132, when simultaneous dual frequency operation is employed by the radar system 100, the outputs of the video integrator 132 for the two available frequency threads F1 and F2 can be combined.

The video integrated output data of the video integrator 132 are then processed by the CFAR detector 134 to produce detection results. Various CFAR techniques. may be used to implement the CFAR detector 134. One technique that can be used is the Cell Averaging (CA) CFAR technique in which the greatest of four possible thresholds are used to determine a value for the CFAR threshold. The thresholds that can be used are based on the early range and late range average with or without peaks edited technique, the no-land-clutter dynamic clutter map 158 value for the test pixel technique, the digital STC map (based on minimum cross section) technique, and the geo-censor map technique. The Cell Averaging (CA) CFAR method works well under circumstances in which there is no land clutter and the weather clutter is suppressed. Large tangential targets can also be readily detected given the lack of land clutter and the suppression of weather clutter. The no-land-clutter dynamic clutter map 158 helps to minimize clutter breakthrough. The no-land-clutter dynamic map 158 can be generated by integrating the peak selected and video integrated data at the output of the video integrator 132 over several scans. This no-land-clutter dynamic clutter map 158 is different from dynamic clutter map 146 since the dynamic clutter map 146 is updated by data from output of power converter 112. The use of the STC map helps to prevent the detection of angel clutter, and the geo-censor map helps to suppress the known geographical interference sources. Alternatively, the Greatest Of (GO) CFAR method can be employed to control the false alarm rate due to clutter transition. When obtaining the threshold based on range averaging, the range cells having the peak values are edited out in the early range and late range windows. This avoids contamination from nearby targets in the estimation of a mean-level CFAR threshold.

In addition, it should be known that in some cases the detector 134 does not need to be a CFAR detector. For instance, a fixed threshold detector, as is known by those skilled in the art, can be used for range cells in which there is no clutter (i.e. no land or weather clutter).

The detection results of the CFAR detector 134 can optionally be processed by the second time around target suppression module 136 before being sent to a downstream radar processing element such as the plot extractor (not shown). The second time around target suppression module 136 compares the outputs of the CFAR detector 134 for m consecutive CPIs to check if there is an extraordinary difference in power to detect erroneous detection results due to multiple around target returns. If the difference is smaller than a preset threshold, the detection result is sent to the plot extractor; otherwise the detection result is suppressed. Regardless of whether the second time around target suppression module 136 is used, the detection results of the of the land-clutter path 118 are provided to the range line multiplexer 142.

For the land-clutter path 118, data based on the outputs of the Doppler filter bank module 110 cannot be peak selected given that the land clutter dominates this data and consequently most targets will most likely be blanked. Accordingly, the CFAR detector module 122 processes a set of input data derived from each output of the Doppler filters used in the Doppler filter bank module 110 separately. For p Doppler filters there can be p CFAR detectors in the CFAR detection module 122. Alternatively, the CFAR detector module 122 can include only one CFAR detector that is used to process each of the input data sets. In either case, the CFAR detector module 122 can be based on various CFAR detection methods. For example, one possible CFAR detection threshold can be, but is not limited to, the GO CFAR technique that uses the greatest of five possible CFAR thresholds based on: the early range average with peak edited technique, the late range average with peak edited technique, the scaled dynamic clutter map value for the pixel technique, the digital STC map (based on minimum cross section) technique, and the geo-censor map technique. Values in the dynamic clutter map 146 can be scaled according to the amplitude of the clutter residue for the Doppler filter from which the current input data set being processed was produced. As in the case of the CFAR detector 134, the use of the STC map helps to prevent the detection of angel clutter, and the geo-censor map helps to suppress the known geographical interference sources. Also, when obtaining the threshold for early and late range averaging, the range cells with peak values are edited out of the early and late range windows. This avoids contamination from nearby targets in the estimation of a mean-level threshold. The GO CFAR method is employed to control the false alarm rate due to clutter transition. The utilization of the dynamic clutter map 146 enables the detection of the tangential targets with large cross-sections and suppresses false alarm breakthrough from clutter residue.

The CFAR detector module 122 provides several CFAR outputs (one for each input data set). If an input data set being processed by the CFAR detector module 122 exceeds the CFAR threshold for a given range cell, then the CFAR detector module 122 includes an alarm in the corresponding CFAR output. The Doppler merge module 124 then selects the biggest target (i.e. the largest CFAR output) from those detected and indicated as such in the CFAR output data for the current range cell that is being processed.

The largest CFAR outputs from the Doppler merge module 124 are then provided to the binary integrator 126. The binary integrator 126 integrates these outputs for m CPIs for a given range cell in a sliding window fashion. The binary integrator 126 can be, but is not limited to, a "2 out of 3" binary integrator. For example, a "3 out of 4" binary integrator can be used. For a "2 out of 3" binary integrator, the largest CFAR outputs must be associated with a detection for 2 out of 3 consecutive CPIs for the binary integrator 126 to declare a detected target. For radar systems that employ simultaneous dual frequency operation, the binary integrator 126 can combine the largest CFAR outputs from the two available frequency threads F1 and F2. The detection results of the binary integrator 126 are provided as detection results for the land-clutter path 118 to the range line multiplexer 142. Also, the binary integrator 126 helps mitigate detection results due to second time around target returns.

The range line multiplexer 142 is essentially a combiner to combine the detection results from the land-clutter path 118 with the detection results of the no-land-clutter path 120 to provide detection data. The range line multiplexer range multiplexes these detection results to obtain the detection data. Any appropriate element for providing this combination can be used. The detection data is then provided to the plot extractor (not shown). The plot extractor provides range and azimuth centroid processing for the target detections that it is provided with. The plot extractor correlates (clusters) all of the target detections associated with a single target and interpolates (estimates) the most possible range and azimuth for that target.

Figure 1B:
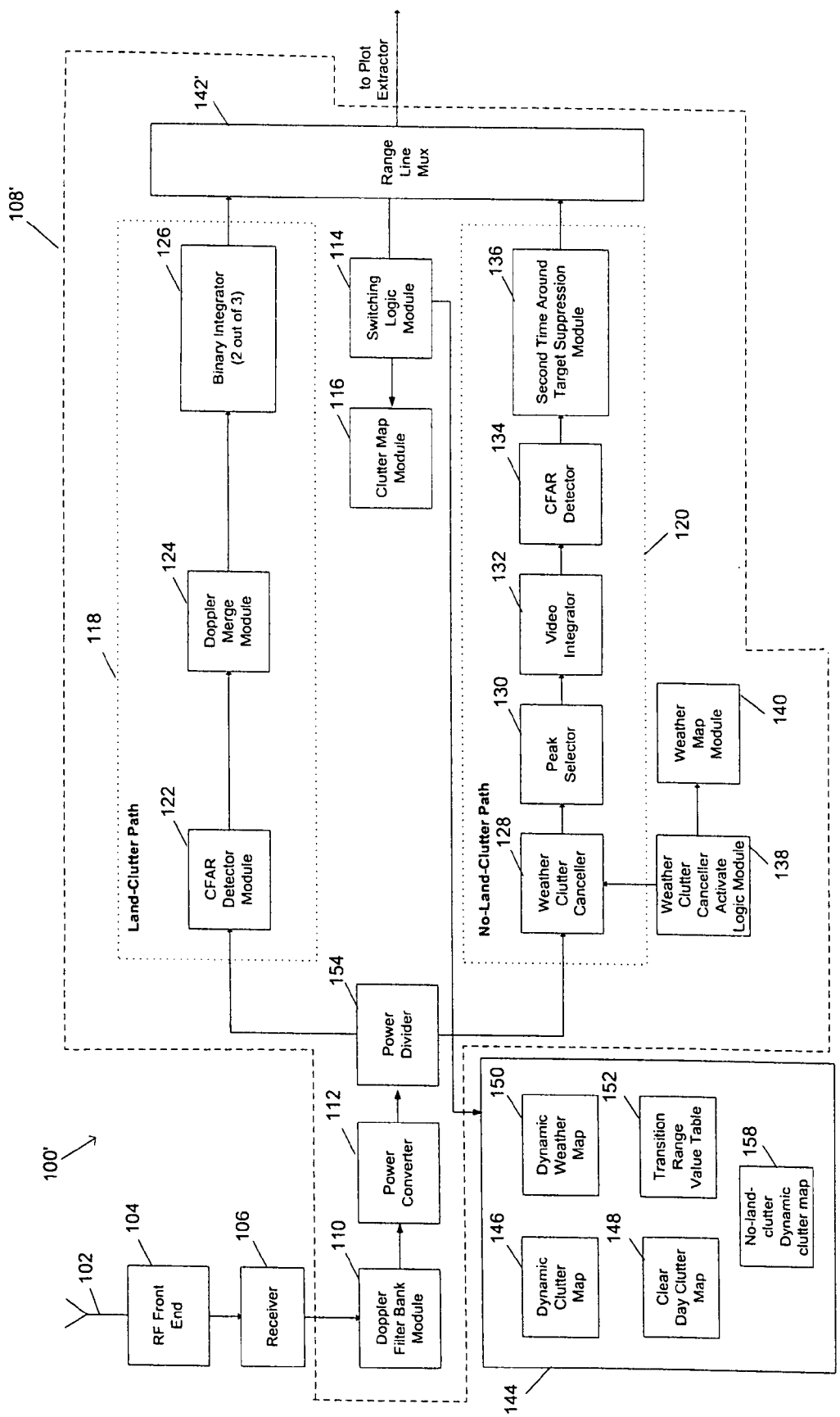
Figure 1C:
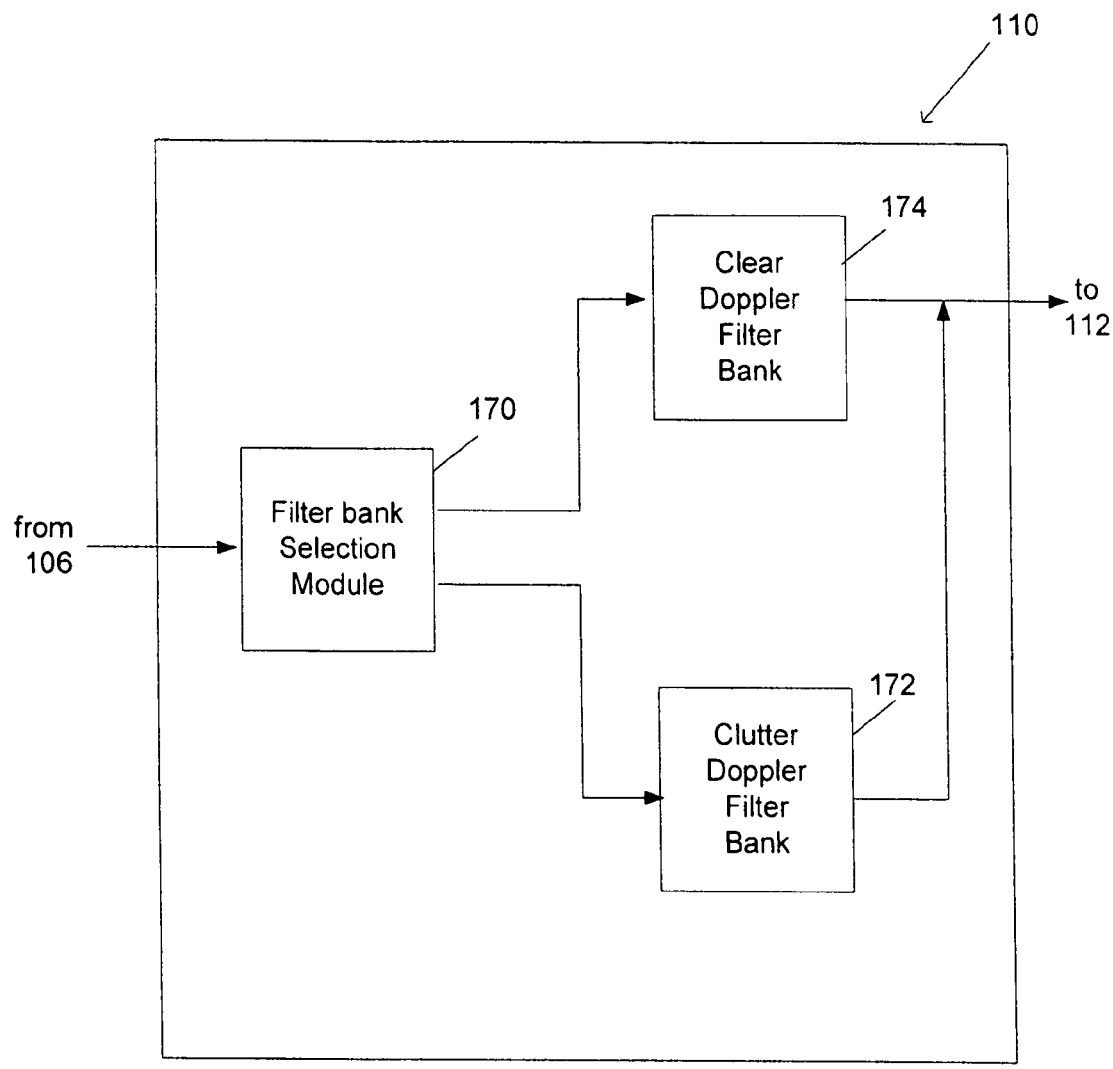
FIG. 1C is a block diagram of different Doppler filter banks that can be used in the moving target detectors of FIGS. 1A and 1B.

Referring now to FIG. 1B, shown therein is a portion of a radar system 100' with an alternative embodiment of a moving target detector (MTD) 108'. The MTD 108' is similar to the MTD 108. However, in the MTD 108', the switching logic module 114 is connected to the range line multiplexer 142' to notify the range line multiplexer 142' of the signal. processing path 118 and 120 from which to accept detection results. In addition, a power divider 154 couples the power converter 112 with the land-clutter path 118 and the no-land clutter path 120. Otherwise, the MTD 108' operates in a similar fashion as the MTD 108, and the various alternatives components/methods described for the MTD 108 are also applicable to the MTD 108'.

It should be noted that values for the various thresholds and parameters used in the various embodiments described herein can be affected by the location of the radar system that collects data for the MTDs 108 and 108'. Accordingly, one method for determining values for these thresholds and parameters can be based on operating the MTD 108 and 108' based on real data, selecting various values for these parameters and thresholds and determining which values provide the best performance. In fact, it is well known to those skilled in the art that it is a well known practice to routinely perform site optimization to select values for the thresholds and operating parameters.

The elements of the MTDs 108 and 108' described herein may be implemented through any means known in the art such as dedicated hardware like a digital signal processor that executes computer instructions. Alternatively, discrete components such as filters, comparators, multipliers and the like may be used. Furthermore, the functionality of certain blocks in the MTDs 108 and 108' may be provided by the same structure. If computer instructions are used, they may be written in Matlab, C, C++, Labview™ or any suitable programming language embodied in a computer readable medium on a computing platform having an operating system and the associated hardware and software that is necessary to implement the MTDs 108 and 108'. The computer instructions can be organized into modules or classes, as is known to those skilled in the art, that are implemented and structured according to the structure of the MTDs 108 and 108'. The MTD 108' can also be implemented via FPGA or DSP-based firmware.

It should be understood that various modifications can be made to the embodiments described and illustrated herein, without departing from the embodiments, the general scope of which is defined in the appended claims.

The invention claimed is:

1. A moving target detector for processing input data to provide detection data, the moving target detector comprising:
    a Doppler filter bank module for processing the input data to provide plurality of Doppler outputs for a current range cell;
    a land-clutter path for providing first detection results based on the plurality of Doppler outputs;
    a no-land-clutter path for providing second detection results based on the plurality of Doppler outputs;
    a switching logic module for selecting one of the land-clutter path and the no-land-clutter path based on clutter information; and
    a range line multiplexer for providing the detection data by combining the first and second detection results across a plurality of range cells.

2. The moving target detector of claim 1, wherein the no-land-clutter path comprises:
    a peak selector for receiving a plurality of input data sets related to the plurality of Doppler outputs and providing a peak output data set by selecting the input data set having the largest power;
    a video integrator for video integrating the peak output data to provide video integrated data; and
    a detector for processing the video integrated data to generate the second detection results.

3. The moving target detector of claim 2, wherein the no-land-clutter path further comprises a second time around target suppression module for reducing erroneous detection results in the second detection results.

4. The moving target detector of claim 2, wherein the no-land-clutter path further comprises a weather clutter canceller for reducing weather clutter in the plurality of input data sets prior to processing by the peak selector.

5. The moving target detector of claim 4, wherein the no-land-clutter path further comprises:
a weather clutter canceller activate logic module for checking a dynamic weather map for weather clutter and activating the weather clutter canceller when the weather clutter is found; and
a weather map module coupled to the weather clutter canceller activate logic module for generating and updating the dynamic weather map.

6. The moving target detector of claim 2, wherein the detector is a cell averaging Constant False Alarm Rate (CFAR) detector configured to employ an early range and late range average with peaks edited threshold, a scaled no-land-clutter dynamic clutter map value for pixel threshold, a digital sensitivity time control map based on minimum cross section threshold, and a geo-censor map threshold.

7. The moving target detector of claim 2, further comprising a transition range value table adapted to store at least one transition range value for each azimuth segment of the radar data, and wherein the clutter information is obtained from the at least one transition range value for each azimuth segment corresponding to the current range cell.

8. The moving target detector of claim 7, wherein the switching logic module is configured to select the no-land-clutter path when the current range cell is at a range greater than a maximum transition range value at a corresponding azimuth segment in the transition range value table.

9. The moving target detector of claim 7, wherein the switching logic module is configured to select the no-land-clutter path when the current range cell is at a range greater than an odd number of transition range values at a corresponding azimuth segment in the transition range value table.

10. The moving target detector of claim 7, wherein the at least one transition range value for one of the azimuth segments is obtained from range values for cells at a corresponding azimuth segment in a clutter map having a clutter level less than a clutter threshold.

11. The moving target detector of claim 10, wherein the clutter map is a dynamic clutter map when anomalous propagation is detected, and a clear day clutter map otherwise.

12. The moving target detector of claim 7, wherein the at least one transition value for one of the azimuth segments is obtained from a maximum of: a first maximum range value for a clear day clutter map cell at a corresponding azimuth segment having a first clutter level larger than a first threshold, a second maximum range value for a dynamic clutter map cell at the corresponding azimuth segment having a clutter level larger than a second threshold plus the first clutter level, and a third maximum range value for a dynamic weather map cell at the corresponding azimuth segment having a clutter level larger than a third threshold.

13. The moving target detector of claim 2, further comprising a clutter map having clutter information stored therein and wherein the switching logic module is configured to select the land-clutter path when clutter level in a cell of the clutter map that corresponds to the current range cell is larger than a clutter threshold and to otherwise select the no-land-clutter path.

14. The moving target detector of claim 13, wherein the clutter map is a dynamic clutter map when anomalous propagation is detected, and a clear day clutter map otherwise.

15. The moving target detector of claim 2, wherein the clutter information comprises a clear day clutter map, a dynamic clutter map and a dynamic weather map, and the switching logic module is configured to perform thresholding on each of the maps, combine the thresholding results and select one of the no-land-clutter path and the land-clutter path based on the combined thresholding result.

16. The moving target detector of claim 15, wherein the switching logic module is configured to select the no-land clutter path when a first clutter level in a clear day clutter map cell corresponding to the current range cell is less than a first threshold, a second clutter level in a dynamic day clutter map cell corresponding to the current range cell is less than a second threshold plus the first clutter level, and a third clutter level in a dynamic weather map cell corresponding to the current range cell is less than a third threshold.

17. The moving target detector of claim 15, wherein the switching logic module is configured to select the no-land clutter path when a first clutter level in a clear day clutter map cell corresponding to the current range cell is less than a first threshold, a second clutter level in a dynamic day clutter map cell corresponding to the current range cell is greater than a second threshold plus the first clutter level, and a third clutter level in a dynamic weather map cell corresponding to the current range cell is greater than a third threshold and less than a fourth threshold.

18. The moving target detector of claim 2, wherein the land-clutter path comprises:
a CFAR detection module for processing the plurality of input data sets to provide a plurality of CFAR outputs;
a Doppler merge module for processing the plurality of CFAR outputs to select the largest CFAR output; and
a binary integrator for providing the first detection results by processing a plurality of selected largest CFAR outputs to indicate a detection when a minimum proportion of the plurality of selected largest CFAR outputs indicate a detected target.

19. The moving target detector of claim 18, wherein the CFAR detection module is configured to employ the greatest of CFAR technique based on an early range with peak edited threshold, a late range average with peak edited threshold, a scaled dynamic clutter map value for pixel threshold, a digital sensitivity time control map based on minimum cross section threshold, and a geo-censor map threshold.

20. The moving target detector of claim 18 further comprising one of a magnitude converter and a power converter for generating the plurality of input data sets based on the plurality of Doppler filter outputs.

21. The moving target detector of claim 2, wherein the Doppler filter bank module comprises a clear Doppler filter bank, and a clutter Doppler filter bank, wherein the clear Doppler filter bank is operational when the current range cell is at a range greater than a maximum transition range value at a corresponding azimuth segment in a transition range value table, otherwise the clutter Doppler filter bank is operational.

22. The moving target detector of claim 1, wherein the no-land-clutter path is configured to process data based on the strongest of the plurality of Doppler outputs prior to performing detection.

23. A method of processing input radar data to provide detection data, the method comprising:
processing the input radar data to provide a plurality of Doppler outputs for a current range cell;

determining whether there is land clutter for the current range cell based upon clutter information;

providing first detection results based upon the plurality of Doppler outputs using a land-clutter path when land clutter is detected for the current range cell;

providing second detection results based upon the plurality of Doppler outputs using a no-land-clutter path when land clutter is not detected for the current range cell; and combining the first and second detection results across a plurality of range cells.

24. The method of claim 23, wherein providing the second detection results comprises:

processing plurality of input data sets related to the plurality of Doppler outputs to provide peak output data by selecting the input data set having the largest power;

video integrating the peak output data to provide video integrated data; and performing detection on the video integrated data for generating the second detection results.

25. The method of claim 24, wherein the method further comprises performing second time around target suppression for reducing erroneous detection results in the second detection results.

26. The method of claim 24, wherein the method further comprises reducing weather clutter in the plurality of input data sets prior to processing to provide the peak output data when weather clutter is detected.

27. The method of claim 24, wherein the detection comprises performing cell averaging Constant False Alarm Rate (CFAR) detection based on an early range and late range average with peaks edited threshold, a scaled no-land-clutter dynamic clutter map value for pixel threshold, a digital sensitivity time control map based on minimum cross section threshold, and a geo-censor map threshold.

28. The method of claim 24, wherein the clutter information is stored in a transition range value table which includes at least one transition range value for each azimuth segment of the radar data.

29. The method of claim 28, wherein the method comprises using the no-land-clutter path when the current range cell is at a range greater than a maximum transition range value at a corresponding azimuth segment in the transition range value table.

30. The method of claim 28, wherein the method comprises using the no-land-clutter path when the current range cell is at a range greater than an odd number of transition range values at a corresponding azimuth segment in the transition range value table.

31. The method of claim 28, wherein the method comprises obtaining the at least one transition range value for one of the azimuth segments from range values for cells at a corresponding azimuth segment in a clutter map having a clutter level less than a clutter threshold.

32. The method of claim 31, wherein the method comprises using a dynamic clutter map for the clutter map when anomalous propagation is detected, and using a clear day clutter map for the clutter map otherwise.

33. The method of claim 28, wherein the at least one transition value for one of the azimuth segments is obtained by selecting a maximum of: a first maximum range value for a clear day clutter map cell at a corresponding azimuth segment having a first clutter level larger than a first threshold, a second maximum range value for a dynamic clutter map cell at the corresponding azimuth segment having a clutter level larger than a second threshold plus the first clutter level, and a third maximum range value for a dynamic weather map cell at the corresponding azimuth segment having a clutter level larger than a third threshold.

34. The method of claim 24 further comprising:

comparing a clutter level in a cell corresponding to the current range cell of a clutter map having the clutter information stored therein to a clutter threshold;

in response to the clutter level of the current range cell being larger than the clutter threshold, selecting the land-clutter path; and in response to the clutter level of the current range cell being less than or equal to the clutter threshold, selecting the no-land-clutter path.

35. The method of claim 34, wherein the method comprises using a dynamic clutter map for the clutter map when anomalous propagation is detected, and using a clear day clutter map for the clutter map otherwise.

36. The method of claim 24, wherein the clutter information comprises a clear day clutter map, a dynamic clutter map and a dynamic weather map, and the method comprises performing thresholding on each of the maps, combining the thresholding results and using one of the no-land-clutter path and the land-clutter path based on the combined thresholding result.

37. The method of claim 36, wherein the method comprises using the no-land clutter path when a first clutter level in a clear day clutter map cell corresponding to the current range cell is less than a first threshold, a second clutter level in a dynamic day clutter map cell corresponding to the current range cell is less than a second threshold plus the first clutter level, and a third clutter level in a dynamic weather map cell corresponding to the current range cell is less than a third threshold.

38. The method of claim 36, wherein the method comprises using the no-land clutter path when a first clutter level in a clear day clutter map cell corresponding to the current range cell is less than a first threshold, a second clutter level in a dynamic day clutter map cell corresponding to the current range cell is greater than a second threshold plus the first clutter level, and a third clutter level in a dynamic weather map cell corresponding to the current range cell is greater than a third threshold and less than a fourth threshold.

39. The method of claim 24, wherein providing the first detection results comprises:

performing CFAR detection on the plurality of input data sets to provide plurality of CFAR outputs;

processing the plurality of CFAR outputs to select the largest CFAR output; and providing the first detection results by processing plurality of selected largest CFAR outputs to indicate a detection when a minimum proportion of the plurality of selected largest CFAR outputs indicate a detected target.

40. The method of claim 39, wherein the CFAR detection comprises employing the greatest of CFAR technique based on an early range with peak edited threshold, a late range average with peak edited threshold, a scaled dynamic clutter map value for pixel threshold, a digital sensitivity time control map based on minimum cross section threshold, and a geo-censor map threshold.

41. The method of claim 39, wherein the method further comprises performing one of magnitude conversion and power conversion for generating the plurality of input data sets based on the plurality of Doppler filter outputs.

42. The method of claim 24, wherein the method comprises using one of a clear Doppler filter bank, and a clutter Doppler filter bank to provide the plurality of Doppler outputs, wherein the clear Doppler filter bank is used when the current range cell is at a range greater than a maximum transition range value at a corresponding azimuth segment in a transition range value table, otherwise the clutter Doppler filter bank is used.

43. The method of claim 23, wherein the method comprises processing data based upon the strongest of the plurality of Doppler outputs prior to performing detection when the no-land-clutter path is used.

44. A computer readable medium for processing input radar data to provide detection data, the computer readable medium having program code stored thereon, the program code executable by a processor for implementing a method comprising:

processing the input radar data to provide a plurality of Doppler outputs for a current range cell;

determining whether there is land clutter for the current range cell based upon clutter information;

providing first detection results based upon the plurality of Doppler outputs using a land-clutter path when land clutter is detected for the current range cell;

providing second detection results based on the plurality of Doppler outputs using a no-land-clutter path when land clutter is not detected for the current range cell; and combining the first and second detection results across a plurality of range cells.

45. A moving target detector for processing input data to perform detection for a current range cell, the moving target detector comprising:

a Doppler filter bank module for processing the input data to provide a plurality of Doppler outputs for the current range cell;

a no-land-clutter path for processing plurality of input data sets related to the plurality of Doppler outputs to provide second detection data by performing peak selection on each of the plurality of input data sets and performing detection on the results of the peak selection;

a land-clutter path for processing the plurality of input data sets to provide first detection data by performing Constant False Alarm Rate (CFAR) detection on each of the plurality of input data sets and merging the detection results; and a switching logic module for selecting one of the land-clutter path and the no-land-clutter path based on clutter information.

* * * * *

UNITED STATES PATENT AND TRADEMARK OFFICE
CERTIFICATE OF CORRECTION

| | | |
|---|---|---|
| PATENT NO. | : 7,741,992 B2 | Page 1 of 1 |
| APPLICATION NO. | : 12/298059 | |
| DATED | : June 22, 2010 | |
| INVENTOR(S) | : Jian Wang et al. | |

It is certified that error appears in the above-identified patent and that said Letters Patent is hereby corrected as shown below:

On the Title Pg Item (57) Abstract, Line 12 delete "Ala$\pi$m" and replace with --Alarm--.

Column 4, line 20 delete "The" and replace with --This--.

Column 4, line 23 delete "comprises" and replace with --comprise--.

Column 4, line 50 delete "comprises" and replace with --comprise--.

Column 6, line 40 after "is" insert --a--.

Column 10, line 63 delete "an" and replace with --and--.

Column 12, line 5 delete "maps." and replace with --map.--.

Column 13, line 52 delete "path is selected 118." and replace with --path 118 is selected.--.

Column 16, line 18 after "dynamic" insert --clutter--.

Column 16, line 51 delete the first instance of "of the".

Column 19, line 28 delete "data. and" and replace with --data and--.

Column 21, line 13 after "processing" insert --a--.

Column 22, line 46 delete "provide plurality" and replace with --provide a plurality--.

Column 22, line 49 delete "processing plurality" and replace with --processing a plurality--.

Column 24, line 9 delete "processing plurality" and replace with --processing a plurality--.

Signed and Sealed this

Twenty-first Day of September, 2010

David J. Kappos
*Director of the United States Patent and Trademark Office*